US011665699B2

(12) United States Patent
Takeda et al.

(10) Patent No.: US 11,665,699 B2
(45) Date of Patent: May 30, 2023

(54) DOWNLINK CONTROL INFORMATION (DCI) DESIGN FOR MULTI-COMPONENT CARRIER SCHEDULING

(71) Applicant: QUALCOMM Incorporated, San Diego, CA (US)

(72) Inventors: Kazuki Takeda, Tokyo (JP); Wanshi Chen, San Diego, CA (US); Peter Gaal, San Diego, CA (US); Xiaoxia Zhang, San Diego, CA (US); Huilin Xu, San Diego, CA (US); Mostafa Khoshnevisan, San Diego, CA (US); Tao Luo, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/220,562

(22) Filed: Apr. 1, 2021

(65) Prior Publication Data

US 2021/0321440 A1    Oct. 14, 2021

Related U.S. Application Data

(60) Provisional application No. 63/007,815, filed on Apr. 9, 2020.

(51) Int. Cl.
*H04W 72/12* (2023.01)
*H04W 72/1273* (2023.01)
(Continued)

(52) U.S. Cl.
CPC ....... *H04W 72/1289* (2013.01); *H04L 1/1819* (2013.01); *H04W 72/0453* (2013.01); *H04W 72/1257* (2013.01); *H04W 72/1273* (2013.01)

(58) Field of Classification Search
CPC ... H04L 1/0026; H04L 1/1854; H04L 5/0057; H04W 72/04; H04W 72/1273; H04W 72/1257; H04W 72/1289
See application file for complete search history.

(56) References Cited

U.S. PATENT DOCUMENTS

2011/0076962 A1  3/2011  Chen et al.
2011/0081939 A1  4/2011  Damnjanovic et al.
(Continued)

OTHER PUBLICATIONS

International Search Report and Written Opinion—PCT/US2021/025783—ISA/EPO—dated Jul. 6, 2021.

*Primary Examiner* — Romani Ohri
(74) *Attorney, Agent, or Firm* — Haynes and Boone, LLP

(57) ABSTRACT

Wireless communication devices, systems, and methods related to downlink control information (DCI) designs for multi-component carrier scheduling are provided. For example, a method of wireless communication can include receiving a downlink control information (DCI) message having a DCI format, the DCI message scheduling a downlink data communication over a single component carrier or multiple component carriers; determining, based on the received DCI message, whether the downlink data communication is scheduled over the single component carrier or the multiple component carriers; and receiving, based on the determining, the downlink data communication over the single component carrier or the multiple component carriers.

28 Claims, 11 Drawing Sheets

(51) Int. Cl.
  *H04L 1/1812*        (2023.01)
  *H04W 72/0453*       (2023.01)

(56)           References Cited

U.S. PATENT DOCUMENTS

| | | |
|---|---|---|
| 2011/0292891 A1 | 12/2011 | Hsieh et al. |
| 2012/0009923 A1 | 1/2012 | Chen et al. |
| 2014/0044085 A1* | 2/2014 | Hong .................... H04L 5/0053 370/329 |
| 2014/0086184 A1* | 3/2014 | Guan .................... H04L 5/0053 370/329 |
| 2015/0180616 A1* | 6/2015 | Lee ..................... H04W 72/048 370/329 |
| 2016/0227523 A1 | 8/2016 | Desai et al. |
| 2018/0123769 A1* | 5/2018 | Pelletier ................ H04L 5/0053 |
| 2019/0281590 A1 | 9/2019 | Pan et al. |
| 2020/0100154 A1* | 3/2020 | Cirik ................. H04W 72/0406 |
| 2020/0228248 A1* | 7/2020 | Islam ................... H04L 5/0055 |
| 2020/0374045 A1* | 11/2020 | Yin .................... H04W 72/042 |
| 2021/0136806 A1* | 5/2021 | Xiong ............... H04W 72/1289 |

* cited by examiner

DOWNLINK CONTROL INFORMATION (DCI) DESIGN FOR MULTI-COMPONENT CARRIER SCHEDULING

CROSS-REFERENCE TO RELATED APPLICATIONS

The present application claims priority to and the benefit of U.S. Provisional Application No. 63/007,815, filed Apr. 9, 2020, which is hereby incorporated by reference in its entirety as if fully set forth below and for all applicable purposes.

TECHNICAL FIELD

This application relates to wireless communication systems, and more particularly to downlink control information (DCI) designs for multi-component carrier scheduling, including associated methods, devices, and systems.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Dynamic spectrum sharing (DSS) allows the LTE technology and NR technology to operate in the same frequency band and share the same frequency spectrum. DSS also allows operators to dynamically allocate the frequency spectrum based on need. This means that a frequency band of an NR cell that operates using DSS may be allocated to an LTE cell and vice versa. Accordingly, there is a need to provide cross-carrier scheduling techniques that facilitate the efficient use of resources, while providing the flexibility to schedule data communications over one or multiple cells.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Aspects of the present disclosure provide mechanisms for scheduling data using cross-carrier scheduling and/or multi-carrier (or joint-carrier) scheduling. In cross-carrier scheduling, a scheduling cell uses the downlink control information (DCI) of the scheduling cell to schedule data on a channel (e.g., PDSCH or a PUSCH) of a scheduled cell. The scheduling cell can be a primary cell (P Cell), a primary secondary (P(S) Cell), and/or a secondary cell (S Cell). Likewise, the scheduled cell can be a P Cell, a P(S) Cell, and/or an S Cell. In a multi-carrier scheduling scheme, the scheduling cell can use a single DCI to schedule data for data transmissions on multiple cells, where the scheduling cell may be a P Cell, a P(S) Cell, or an S Cell, and each of the scheduled cells may be a P Cell, a P(S) Cell, or an S Cell.

In some instances, a different DCI format can be utilized to schedule single-carrier data transmissions as compared to multi-carrier data transmissions. That is, a first DCI format can be used for single-carrier scheduling and a second, different DCI format can be used for multi-carrier scheduling. In this regard, a UE may determine whether data is scheduled for transmission over a single carrier or multiple carriers based on the format of the received DCI.

In some instances, a common DCI format can be utilized to schedule both single-carrier data transmissions and multi-carrier data transmissions. That is, the same DCI format that is used for single-carrier scheduling can be used for multi-carrier scheduling. In this regard, one or more aspects of the DCI (e.g., the search space in which the DCI is received, the value(s) of one or more fields of the DCI, etc.) can indicate whether the scheduled data is to be communicated over a single carrier or multiple carriers.

In some instances, the DCI includes separate hybrid automatic repeat request (HARQ) process IDs for each carrier of a multi-carrier data transmission. Having separate HARQ process IDs can allow retransmissions to be scheduled on each carrier separately. This can facilitate scheduling, via a single DCI, retransmission of data associated with a first HARQ process on a first carrier and retransmission of data associated with a second HARQ process on a second, different carrier, which can improve efficiency and reduce latency.

Aspects of the present disclosure provide several benefits. As an initial matter, the cross-carrier and multi-carrier scheduling techniques of the present disclosure provide improved spectral efficiency. For example, using a single DCI to schedule communications over multiple carriers is more efficient and reduces the signaling requirements compared to existing techniques that require multiple DCIs for multi-carrier scheduling. Also, using a common DCI format for both single-carrier and cross-carrier scheduling can provide a simplified and consistent processing of the DCI at the UE, avoiding the need to have separate dedicated DCI formats (and associated processing techniques/algorithms at the UE) for single-carrier scheduling and multi-carrier scheduling. Further, aspects of the present disclosure allow cross-carrier scheduling from an S Cell to a P(S) Cell (and/or a P Cell), which can free up PDCCH resources of the P(S) Cell (and/or the P(S) Cell). Further still, in a dynamic spectrum sharing (DSS) environment, a non-DSS cell can use a single DCI to schedule data on a DSS cell and/or the non-DSS cell. While aspects of the present disclosure have particular benefits in the context of DSS, it is understood that the concepts can be applied in a similar manner to cross-carrier scheduling for carrier aggregation.

In an aspect of the disclosure, a method of wireless communication performed by a user equipment includes receiving a downlink control information (DCI) message having a DCI format, the DCI message scheduling a downlink data communication over a single component carrier or multiple component carriers; determining, based on the received DCI message, whether the downlink data communication is scheduled over the single component carrier or the multiple component carriers; and receiving, based on the determining, the downlink data communication over the single component carrier or the multiple component carriers.

In an additional aspect of the disclosure, a method of wireless communication performed by a base station includes transmitting a first downlink control information (DCI) message having a DCI format, the first DCI message scheduling a first downlink data communication over a single component carrier; transmitting the first downlink data communication over the single component carrier; transmitting a second DCI message having the DCI format, the second DCI message scheduling a second downlink data communication over multiple component carriers; and transmitting the second downlink data communication over the multiple component carriers.

In an additional aspect of the disclosure, a user equipment includes a transceiver configured to receive a downlink control information (DCI) message having a DCI format, the DCI message scheduling a downlink data communication over a single component carrier or multiple component carriers; and a processor in communication with the transceiver, the processor configured to determine, based on the received DCI message, whether the downlink data communication is scheduled over the single component carrier or the multiple component carriers, wherein the transceiver is further configured to receive, based on the determination of the processor, the downlink data communication over the single component carrier or the multiple component carriers.

In an additional aspect of the disclosure, a base station includes a transceiver configured to: transmit a first downlink control information (DCI) message having a DCI format, the first DCI message scheduling a first downlink data communication over a single component carrier; transmit the first downlink data communication over the single component carrier; transmit a second DCI message having the DCI format, the second DCI message scheduling a second downlink data communication over multiple component carriers; and transmit the second downlink data communication over the multiple component carriers.

In an additional aspect of the disclosure, a user equipment includes means for receiving a downlink control information (DCI) message having a DCI format, the DCI message scheduling a downlink data communication over a single component carrier or multiple component carriers; means for determining, based on the received DCI message, whether the downlink data communication is scheduled over the single component carrier or the multiple component carriers; and means for receiving, based on the determining, the downlink data communication over the single component carrier or the multiple component carriers.

In an additional aspect of the disclosure, a base station includes means for transmitting a first downlink control information (DCI) message having a DCI format, the first DCI message scheduling a first downlink data communication over a single component carrier; means for transmitting the first downlink data communication over the single component carrier; means for transmitting a second DCI message having the DCI format, the second DCI message scheduling a second downlink data communication over multiple component carriers; and means for transmitting the second downlink data communication over the multiple component carriers.

In an additional aspect of the disclosure, a non-transitory computer-readable medium has program code recorded thereon for wireless communication by a user equipment, the program code including code for causing the user equipment to receive a downlink control information (DCI) message having a DCI format, the DCI message scheduling a downlink data communication over a single component carrier or multiple component carriers; code for causing the user equipment to determine, based on the received DCI message, whether the downlink data communication is scheduled over the single component carrier or the multiple component carriers; and code for causing the user equipment to receive, based on the determining, the downlink data communication over the single component carrier or the multiple component carriers.

In an additional aspect of the disclosure, a non-transitory computer-readable medium has program code recorded thereon for wireless communication by a base station, the program code including code for causing the base station to transmit a first downlink control information (DCI) message having a DCI format, the first DCI message scheduling a first downlink data communication over a single component carrier; code for causing the base station to transmit the first downlink data communication over the single component carrier; code for causing the base station to transmit a second DCI message having the DCI format, the second DCI message scheduling a second downlink data communication over multiple component carriers; and code for causing the base station to transmit the second downlink data communication over the multiple component carriers.

Other aspects, features, and advantages of the present invention will become apparent to those of ordinary skill in the art, upon reviewing the following description of specific, exemplary embodiments of the present invention in conjunction with the accompanying figures. While features of the present invention may be discussed relative to certain examples and figures below, all embodiments of the present invention can include one or more of the advantageous features discussed herein. In other words, while one or more embodiments may be discussed as having certain advantageous features, one or more of such features may also be used in accordance with the various other embodiments of the invention discussed herein. In similar fashion, while exemplary embodiments may be discussed below as device, system, or method embodiments, it should be understood that such exemplary embodiments can be implemented in various devices, systems, and methods.

DETAILED DESCRIPTION

Figure 1:
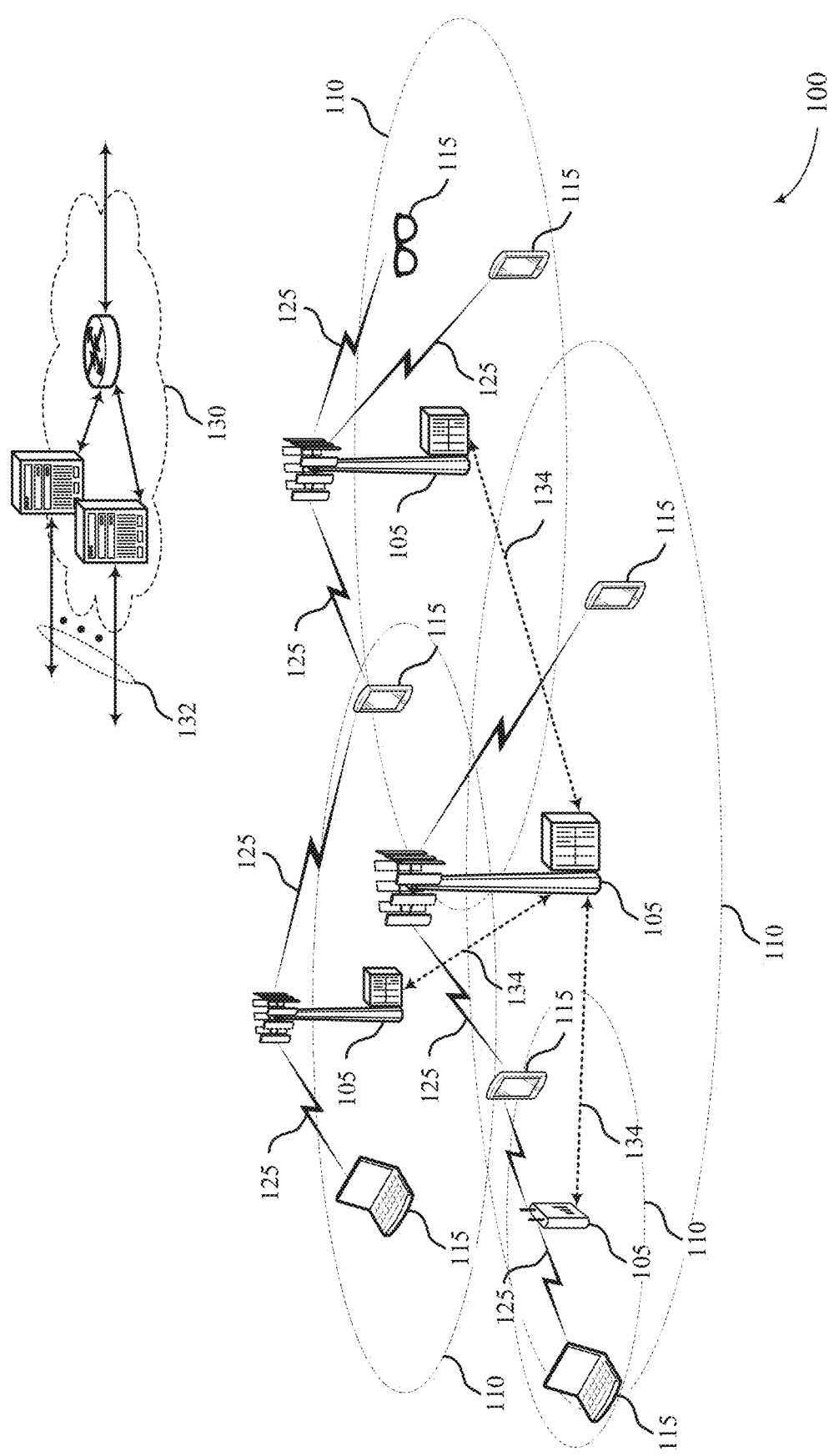
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Aspects of the present disclosure provide mechanisms for scheduling data using cross-carrier scheduling and/or multi-carrier (or joint-carrier) scheduling. In cross-carrier scheduling, a scheduling cell uses the downlink control information (DCI) of the scheduling cell to schedule data on a channel (e.g., PDSCH or a PUSCH) of a scheduled cell. The scheduling cell can be a primary cell (P Cell), a primary secondary (P(S) Cell), and/or a secondary cell (S Cell). Likewise, the scheduled cell can be a P Cell, a P(S) Cell, and/or an S Cell. In a multi-carrier scheduling scheme, the scheduling cell can use a single DCI to schedule data for data transmissions on multiple cells, where the scheduling cell may be a P Cell, a P(S) Cell, or an S Cell, and each of the scheduled cells may be a P Cell, a P(S) Cell, or an S Cell.

In some instances, a different DCI format can be utilized to schedule single-carrier data transmissions as compared to multi-carrier data transmissions. That is, a first DCI format can be used for single-carrier scheduling and a second, different DCI format can be used for multi-carrier scheduling. In this regard, a UE may determine whether data is scheduled for transmission over a single carrier or multiple carriers based on the format of the received DCI.

In some instances, a common DCI format can be utilized to schedule both single-carrier data transmissions and multi-carrier data transmissions. That is, the same DCI format that is used for single-carrier scheduling can be used for multi-carrier scheduling. In this regard, one or more aspects of the DCI (e.g., the search space in which the DCI is received, the value(s) of one or more fields of the DCI, etc.) can indicate whether the scheduled data is to be communicated over a single carrier or multiple carriers.

In some instances, the DCI includes separate hybrid automatic repeat request (HARQ) process IDs for each carrier of a multi-carrier data transmission. Having separate HARQ process IDs can allow retransmissions to be scheduled on each carrier separately. This can facilitate scheduling, via a single DCI, retransmission of data associated with a first HARQ process on a first carrier and retransmission of data associated with a second HARQ process on a second, different carrier, which can improve efficiency and reduce latency.

These and other aspects of the present disclosure can provide several benefits. As an initial matter, the cross-carrier and multi-carrier scheduling techniques of the present disclosure provide improved spectral efficiency. For example, using a single DCI to schedule communications over multiple carriers is more efficient and reduces the signaling requirements compared to existing techniques that require multiple DCIs for multi-carrier scheduling. Also, using a common DCI format for both single-carrier and cross-carrier scheduling can provide a simplified and consistent processing of the DCI at the UE, avoiding the need to have separate dedicated DCI formats (and associated processing techniques/algorithms at the UE) for single-carrier scheduling and multi-carrier scheduling. Further, aspects of the present disclosure allow cross-carrier scheduling from an S Cell to a P(S) Cell (and/or a P Cell), which can free up PDCCH resources of the P(S) Cell (and/or the P(S) Cell). Further still, in a dynamic spectrum sharing (DSS) environment, a non-DSS cell can use a single DCI to schedule data on a DSS cell and/or the non-DSS cell. While aspects of the present disclosure have particular benefits in the context of DSS, it is understood that the concepts can be applied in a similar manner to cross-carrier scheduling for carrier aggregation. Additional features and benefits of the present disclosure are set forth in the following description.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as a message 1 (MSG 1), a message 2 (MSG 2), a message 3 (MSG 3), and a message 4 (MSG 4), respectively. In some examples, the random access procedure may be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (MSG A). The combined random access response and connection response in the two-step random access procedure may be referred to as a message B (MSG B).

After establishing a connection, the UE 115 may initiate an initial network attachment procedure with the network 100. When the UE 115 has no active data communication with the BS 105 after the network attachment, the UE 115 may return to an idle state (e.g., RRC idle mode). Alternatively, the UE 115 and the BS 105 can enter an operational state or active state, where operational data may be exchanged (e.g., RRC connected mode). For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. In some embodiments, the BS 105 and the UE 115 may employ hybrid automatic request (HARQ) techniques for communications to improve reliability. Additionally, the UE 115 and/or the BS 105 can utilize DRX (e.g., during RRC idle mode), including connected mode DRX (C-DRX) (e.g., during RRC connected mode), and/or DTX operating modes.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some instances, a BS 105 may assign a pair of BWPs within the CC to a UE 115 for UL and DL communications. For example, the BWP pair may include one BWP for UL communications and one BWP for DL communications. In some instances, the BS 105 may dynamically switch the UE 115 from one BWP to another BWP, for example, from a wideband BWP to a narrowband BWP for power savings or from a narrowband BWP to a wideband BWP for communication.

The BS 105 may additionally configure the UE 115 with one or more CORESETs in a BWP. A CORESET may include a set of frequency resources spanning a number of symbols in time. The BS 105 may configure the UE 115 with one or more search spaces for PDCCH monitoring based on the CORESETS. The UE 115 may perform blind decoding in the search spaces to search for DL control information from the BS. The BS 105 may configure the UE 115 with various different CORSETs and/or search spaces for different types of PDCCH monitoring (e.g., DL/UL schedules and/or wake-up information). In an example, the BS 105 may configure the UE 115 with the BWPs, the CORESETS, and/or the PDCCH search spaces via RRC configurations.

In an embodiment, the BS 105 may establish a RRC connection with the UE 115 in a primary cell (PCell) (e.g., over a primary frequency carrier) and may subsequently configure the UE 115 to communicate over a secondary cell (SCell) (e.g., over a secondary frequency carrier). In an embodiment, the BS 105 may trigger the UE 115 to report channel information based on channel-state-information-reference signal (CSI-RS) transmitted by the BS 105. In some instances, the triggering may be aperiodic, which may be referred to as aperiodic-CSI-RS (A-CSI-RS) triggering.

The network 100 may operate over a shared frequency band or an unlicensed frequency band, for example, at about 3.5 gigahertz (GHz), sub-6 GHz or higher frequencies in the mmWave band. The network 100 may partition a frequency band into multiple channels, for example, each occupying about 20 megahertz (MHz). The BSs 105 and the UEs 115 may be operated by multiple network operating entities sharing resources in the shared communication medium and may acquire channel occupancy time (COT) in the share medium for communications. A COT may be non-continuous in time and may refer to an amount of time a wireless node can send frames when it has won contention for the wireless medium. Each COT may include a plurality of transmission slots. A COT may also be referred to as a transmission opportunity (TXOP).

Figure 2A:
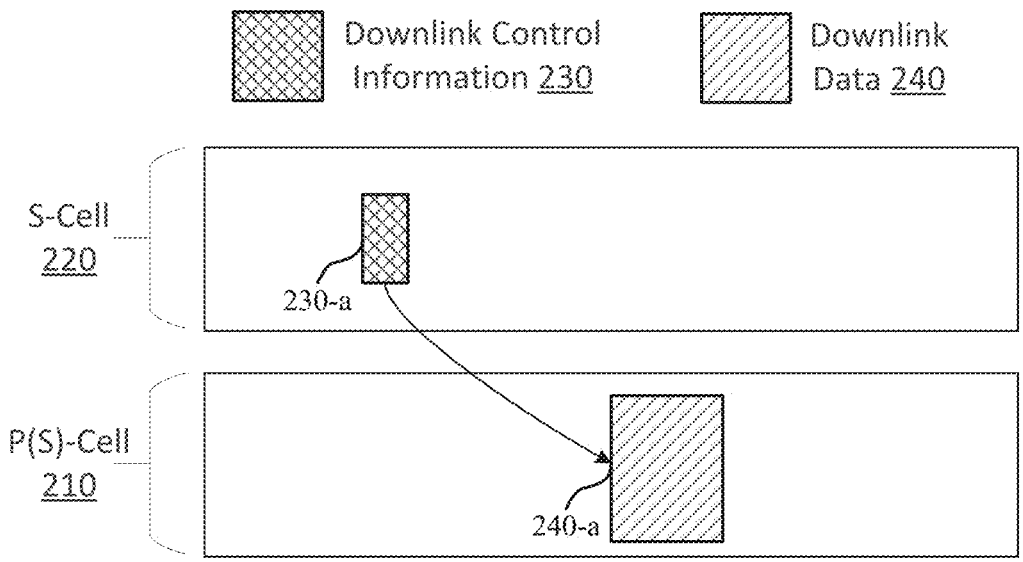
FIG. 2A illustrates a cross-carrier scheduling technique according to some aspects of the present disclosure.

FIG. 2A illustrates a cross-carrier scheduling technique 200 according to some aspects of the present disclosure. In this regard, aspects of the present disclosure provide mechanisms for scheduling data using cross-carrier scheduling. In cross-carrier scheduling, a scheduling cell uses the downlink control information (DCI) 230 of the scheduling cell to schedule downlink data 240 on a channel (e.g., PDSCH or a PUSCH) of a scheduled cell. The scheduling cell can be a primary cell (P Cell), a primary secondary (P(S) Cell), and/or a secondary cell (S Cell). Likewise, the scheduled cell can be a P Cell, a P(S) Cell, and/or an S Cell. FIG. 2A illustrates the cross-carrier scheduling technique 200 between a P(S) Cell 210 and an S Cell 220. In some instances, the P(S) Cell 210 is a dynamic spectrum sharing (DSS) cell. In some instances, the S Cell 220 is a non-DSS cell. As shown, a DCI 230-a transmitted over a control channel (e.g., PDCCH) of the S Cell 220 is utilized to schedule downlink data 240-a over a data channel (e.g., PDSCH) of the P(S) Cell 210. While FIG. 2A illustrates an example of cross-carrier scheduling, the present disclosure is broadly applicable to other cross-carrier scheduling situations.

Figure 2B:
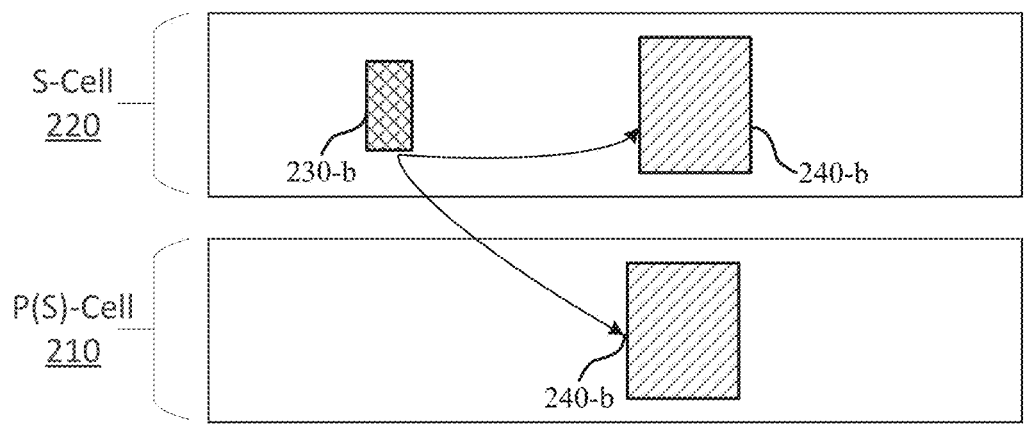
FIG. 2B illustrates a multi-carrier scheduling technique according to some aspects of the present disclosure.

FIG. 2B illustrates a multi-carrier scheduling technique 250 according to some aspects of the present disclosure. In this regard, aspects of the present disclosure provide mechanisms for scheduling data using multi-carrier scheduling. In a multi-carrier scheduling scheme, the scheduling cell can use a single DCI to schedule data for data transmissions on multiple cells. The scheduling cell may be a P Cell, a P(S) Cell, or an S Cell, and each of the scheduled cells may be a P Cell, a P(S) Cell, or an S Cell. FIG. 2B illustrates the multi-carrier scheduling technique 250 between a P(S) Cell 210 and an S Cell 220. In some instances, the P(S) Cell 210 is a dynamic spectrum sharing (DSS) cell. In some instances, the S Cell 220 is a non-DSS cell. As shown, a DCI 230-b transmitted over a control channel (e.g., PDCCH) of the S Cell 220 is utilized to schedule downlink data 240-b over a data channel (e.g., PDSCH) of the P(S) Cell 210 and downlink data 240-b over a data channel (e.g., PDSCH) of the S Cell 220. In some instances, the data 240-b transmitted over the P(S) Cell 210 may be the same, or at least partially the same, as the downlink data 240-b transmitted over the S Cell 220. In some instances, the data 240-b transmitted over the P(S) Cell 210 may be different, or at least partially different, from the downlink data 240-b transmitted over the S Cell 220 (e.g., for frequency diversity purposes). While FIG. 2B illustrates an example of multi-carrier scheduling, the present disclosure is broadly applicable to other multi-carrier scheduling situations.

Figure 3A:
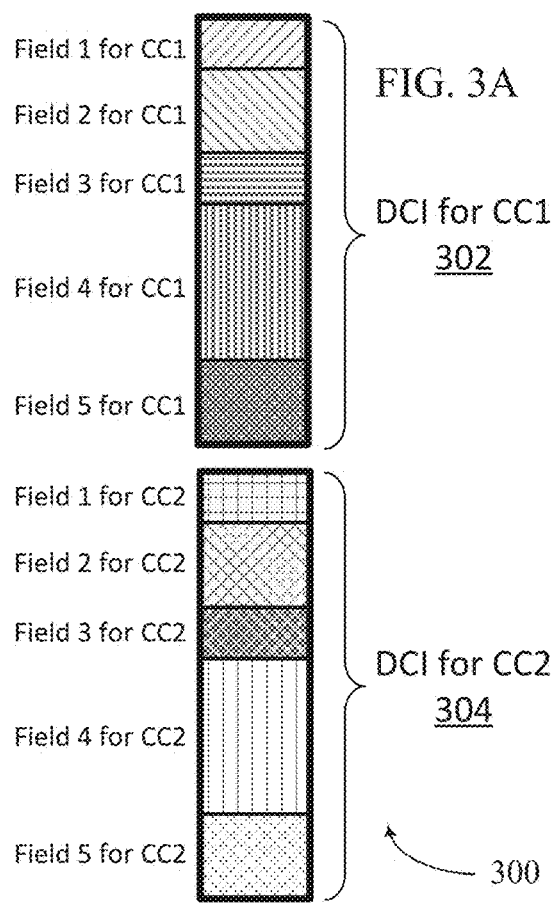
FIG. 3A illustrates a DCI format for multi-carrier scheduling according to some aspects of the present disclosure.

FIG. 3A illustrates a DCI format 300 for multi-carrier scheduling according to some aspects of the present disclosure. The DCI format 300 includes two separate DCIs, DCI 302 for a first component carrier (CC1) and DCI 304 for a second component carrier (CC2). Each of DCI 302 and DCI 304 includes fields, and associated field values, applicable for the particular component carrier. The particular fields included in DCI 302 and/or DCI 304 can be based on the DCI format utilized, which may be an existing DCI format (e.g., 1_0, 1_1, 1_2, etc.) or a future DCI format, including DCI formats implementing aspects of the present disclosure. The DCI format 310 can be utilized for cross-carrier and/or multi-carrier scheduling in accordance with the present disclosure.

Figure 3B:
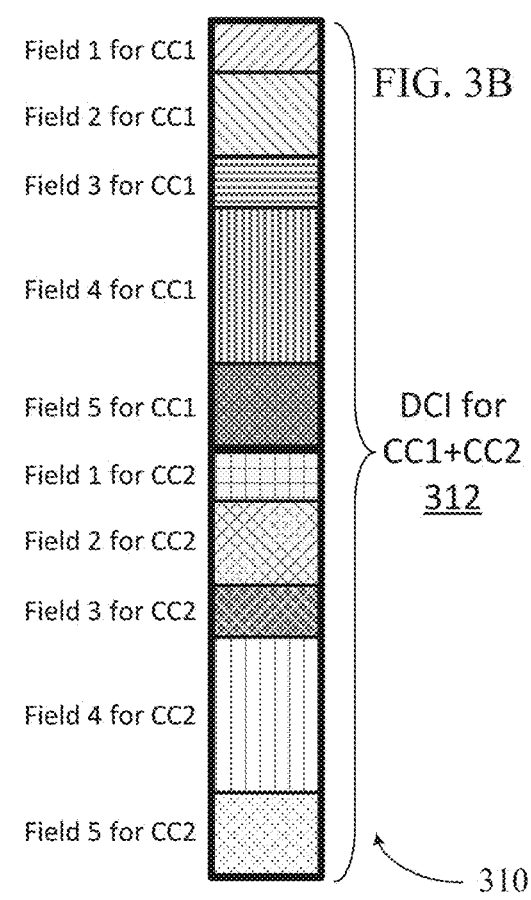
FIG. 3B illustrates a DCI format for multi-carrier scheduling according to some aspects of the present disclosure.

FIG. 3B illustrates a DCI format 310 for multi-carrier scheduling according to some aspects of the present disclosure. The DCI format 310 includes a single DCI 312 for CC1 and CC2. The DCI 312 includes individual fields, and associated field values, applicable for each component carrier. In the illustrated example, the fields are grouped based on the associated component carrier (i.e., all of the fields for CC1 are grouped together and all of the fields for CC2 are grouped together). Even though DCI 312 includes the same fields as DCI 302 and DCI 304 collectively, having a single DCI 312 instead of two separate DCIs (e.g., DCI 302 and DCI 304) can save CRC bits, which can improve the spectral efficiency and/or reduce processing requirements. The DCI format 310 can be utilized for cross-carrier and/or multi-carrier scheduling in accordance with the present disclosure.

Figure 3C:
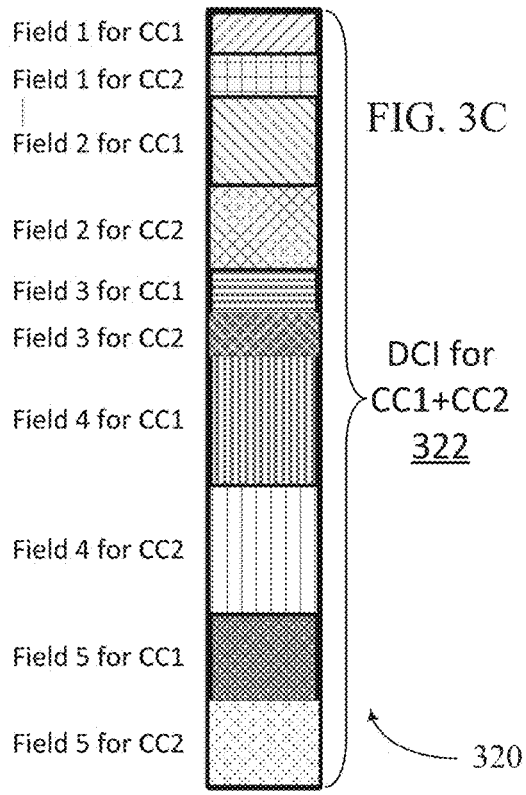
FIG. 3C illustrates a DCI format for multi-carrier scheduling according to some aspects of the present disclosure.

FIG. 3C illustrates a DCI format 320 for multi-carrier scheduling according to some aspects of the present disclosure. The DCI format 320 includes a single DCI 322 for CC1 and CC2. The DCI 322 includes individual fields, and associated field values, applicable for each component carrier. In the illustrated example, the fields are grouped based on field type (i.e., a field for CC1 is positioned adjacent to the corresponding field for CC2). Similar to DCI 312, even though DCI 322 includes the same fields as DCI 302 and DCI 304 collectively, having a single DCI 322 instead of two separate DCIs (e.g., DCI 302 and DCI 304) can save CRC bits, which can improve the spectral efficiency and/or reduce processing requirements. The DCI format 320 can be utilized for cross-carrier and/or multi-carrier scheduling in accordance with the present disclosure.

Figure 3D:
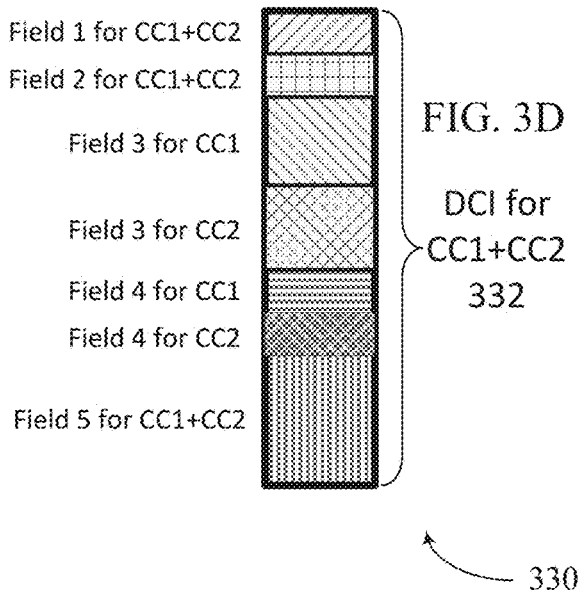
FIG. 3D illustrates a DCI format for multi-carrier scheduling according to some aspects of the present disclosure.

FIG. 3D illustrates a DCI format 330 for multi-carrier scheduling according to some aspects of the present disclosure. The DCI format 330 includes a single DCI 332 for CC1 and CC2. The DCI 332 includes individual fields, and associated field values, applicable for each component carrier for some field types and joint fields, and associated field values, applicable for both component carriers for other field types. In the illustrated example, "Field 3" and "Field 4" are individual fields, while "Field 1," "Field 2," and "Field 5" are joint fields. By including one or more joint fields, the size of the DCI 332 can be reduced as compared to other DCI formats, allowing the DCI to be communicated using less resources. The DCI may organize or group the fields based on component carrier, field type, and/or combinations thereof. The DCI format 330 can be utilized for cross-carrier and/or multi-carrier scheduling in accordance with the present disclosure.

In some instances, DCI formats of the present disclosure can include one or more of a new data indicator (NDI) field, a redundancy version (RV) field, a HARQ process ID field, a modulation and coding scheme (MCS) field, a frequency domain resource allocation (FDRA) field. Further, each of these fields may be an individual field or a joint field. In some instances, the MCS, NDI, and/or RV fields are individual fields such that each component carrier has an associated field value. In some instances, having individual fields allows scheduling of up to four layers over two component carriers or more than four layers over a single component carrier (e.g., for some MIMO applications). For example, the two sets of field values may be used for one codeword on each of two component carriers or two codewords on a single component carrier. In some instances, two sets of the MCS, NDI, and/or RV fields are provided for each component carrier, which can allow for more than four layers to be scheduled on two component carriers in a single DCI. In some instances, the RV field is a single bit.

Figure 4:
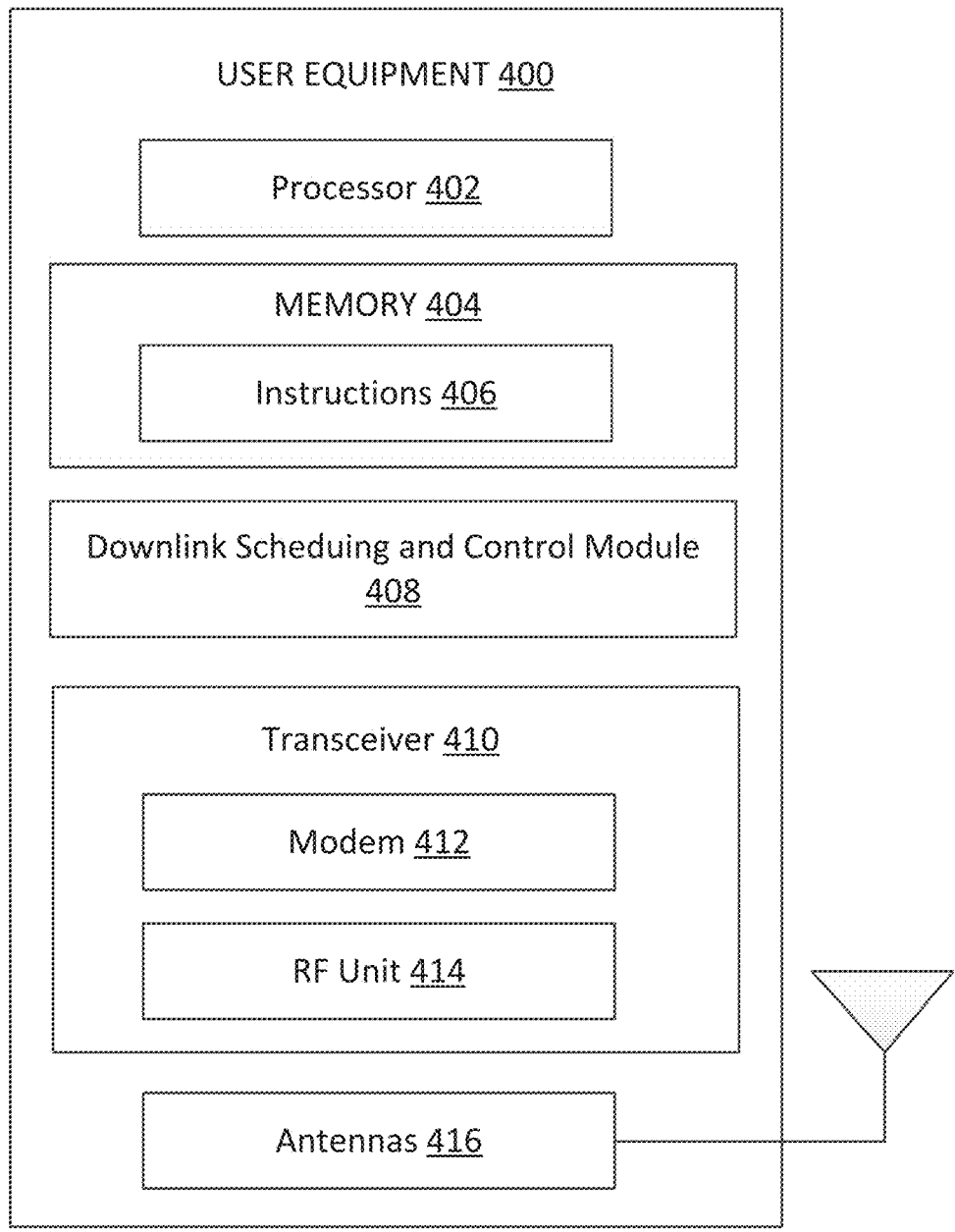
FIG. 4 is a block diagram of a user equipment (UE) according to some aspects of the present disclosure.

FIG. 4 is a block diagram of an exemplary UE 400 according to aspects of the present disclosure. The UE 400 may be a UE 115 as discussed above in FIG. 1. As shown, the UE 400 may include a processor 402, a memory 404, a downlink scheduling and control module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 3, 4, and 7-9. Instructions 406 may also be referred to as program code. The program code may be for causing a wireless communication device (or specific component(s) of the wireless communication device) to perform these operations, for example by causing one or more processors (such as processor 402) to control or command the wireless communication device (or specific component(s) of the wireless communication device) to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The downlink scheduling and control module 408 may be implemented via hardware, software, or combinations thereof. For example, downlink scheduling and control module 408 may be implemented as a processor, circuit, and/or instructions 406 stored in the memory 404 and executed by the processor 402. In some examples, the downlink scheduling and control module 408 can be integrated within the modem subsystem 412. For example, the downlink scheduling and control module 408 can be implemented by a combination of software components (e.g., executed by a DSP or a general processor) and hardware components (e.g., logic gates and circuitry) within the modem subsystem 412.

The downlink scheduling and control module 408 may be used for various aspects of the present disclosure, for example, aspects of FIGS. 2A, 2B, 3A, 3B, 3C, 3D, and 6-10. The downlink scheduling and control module 408 is configured to communicate with other components of the UE 400 to receive a DCI configuration, process the DCI configuration, monitor for DCI based on the DCI configuration, determine whether the downlink communications will be transmitted over a single carrier or multiple carriers based on the DCI, monitor for one or more downlink communication(s) from a base station based on the DCI, perform PDCCH monitoring, perform PDSCH monitoring, determine whether a timer has expired, cancel a timer, determine whether a condition has occurred or is met, and/or perform other functionalities related to the power saving configurations and associated wireless communication techniques of a UE described in the present disclosure.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, and/or the downlink scheduling and control module 408 according to a modulation and coding scheme (MCS) (e.g., a low-density parity check (LDPC) coding scheme, a turbo coding scheme, a convolutional coding scheme, a digital beamforming scheme, etc.). The RF unit 414 may be configured to process (e.g., perform analog to digital conversion or digital to analog conversion, etc.) modulated/encoded data (e.g., UL control information, UL data) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data (e.g., data packets or, more generally, data messages that may contain one or more data packets and other information) to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., PDCCH signals, radio resource control (RRC) signals, media access control (MAC) control element (CE) signals, PDSCH signals, DL/UL scheduling grants, DL data, etc.) to the downlink scheduling and control module 408 for processing. The antennas 416 may include multiple antennas of similar or different designs in order to sustain multiple transmission links. The RF unit 414 may configure the antennas 416. The RF unit 414 and/or the transceiver 410 may include components and/or circuitries that can be powers on and/or off dynamically for power savings. Additionally, or alternatively, the RF unit 414 and/or the transceiver 410 may include components and/or circuitries with multiple power states that can be configured to transition from one power state (e.g., a higher-power state) to another power state (e.g., a lower-power state) for power savings.

In an embodiment, the UE 400 can include multiple transceivers 410 implementing different RATs (e.g., NR and LTE). In an embodiment, the UE 400 can include a single transceiver 410 implementing multiple RATs (e.g., NR and LTE). In an embodiment, the transceiver 410 can include various components, where different combinations of components can implement different RATs.

Figure 5:
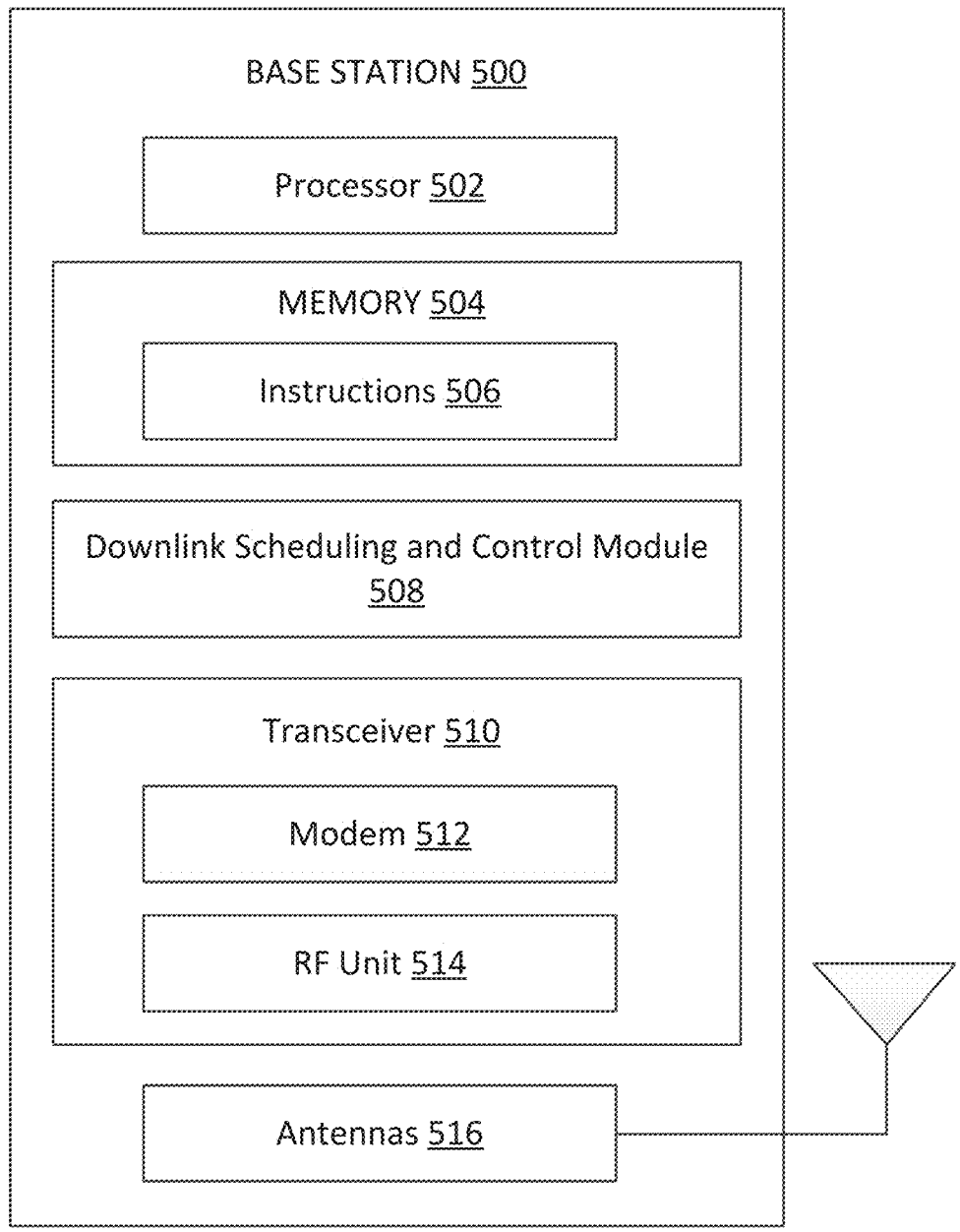
FIG. 5 is a block diagram of an exemplary base station (BS) according to aspects of the present disclosure.

FIG. 5 is a block diagram of an exemplary BS 500 according to aspects of the present disclosure. The BS 500 may be a BS 105 as discussed above in FIG. 1. As shown, the BS 500 may include a processor 502, a memory 504, a downlink scheduling and control module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 3, 4, 7, 8, and 10. Instructions 506 may also be referred to as code, which may be interpreted broadly to include any type of computer-readable statement(s) as discussed above with respect to FIG. 5.

The downlink scheduling and control module 508 may be implemented via hardware, software, or combinations thereof. For example, the downlink scheduling and control module 508 may be implemented as a processor, circuit, and/or instructions 506 stored in the memory 504 and executed by the processor 502. In some examples, the downlink scheduling and control module 508 can be integrated within the modem subsystem 512. For example, the downlink scheduling and control module 508 can be implemented by a combination of software components (e.g., executed by a DSP or a general processor) and hardware components (e.g., logic gates and circuitry) within the modem subsystem 512.

The downlink scheduling and control module 508 may be used for various aspects of the present disclosure, for example, aspects of FIGS. 2A, 2B, 3A, 3B, 3C, 3D, 6-9, and 11. The downlink scheduling and control module 508 can be configured to determine a DCI configuration for one or more UEs, transmit the DCI configuration to the one or more UEs, perform downlink data scheduling over one or more carriers, including cross-carrier and/or multi-carrier scheduling, generate DCI base on the downlink scheduling and/or the DCI configuration, transmit DCI, transmit one or more downlink communication(s) from based on the DCI, transmit PDCCH communications, transmit PDSCH communications, determine whether a timer has expired, cancel a timer, determine whether a condition has occurred or is met, and/or perform other functionalities related to the power saving configurations and associated wireless communication techniques of a base station described in the present disclosure.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS (e.g., a LDPC coding scheme, a turbo coding scheme, a convolutional coding scheme, a digital beamforming scheme, etc.). The RF unit 514 may be configured to process (e.g., perform analog to digital conversion or digital to analog conversion, etc.) modulated/encoded data (e.g., PDCCH signals, RRC signals, MAC CE signals, PDSCH signals, etc.) from the modem subsystem 512 (on outbound transmissions) or of transmissions originating from another source, such as a UE 115 or 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, (e.g., data packets or, more generally, data messages that may contain one or more data packets and other information) to the antennas 516 for transmission to one or more other devices. This may include, for example, transmission of information to a UE 115 or 400 according to aspects of the present disclosure. The antennas 516 may further receive data messages transmitted from other devices and provide the received data messages for processing and/or demodulation at the transceiver 510. The transceiver 510 may provide the demodulated and decoded data (e.g., RACH message(s), ACK/NACKs for PDCCH signals, UL data, ACK/NACKs for DL data, etc.) to the downlink scheduling and control module 508 for processing. The antennas 516 may include multiple antennas of similar or different designs in order to sustain multiple transmission links.

In an embodiment, the BS 500 can include multiple transceivers 510 implementing different RATs (e.g., NR and LTE). In an embodiment, the BS 500 can include a single transceiver 510 implementing multiple RATs (e.g., NR and LTE). In an embodiment, the transceiver 510 can include various components, where different combinations of components can implement different RATs.

Figure 6:
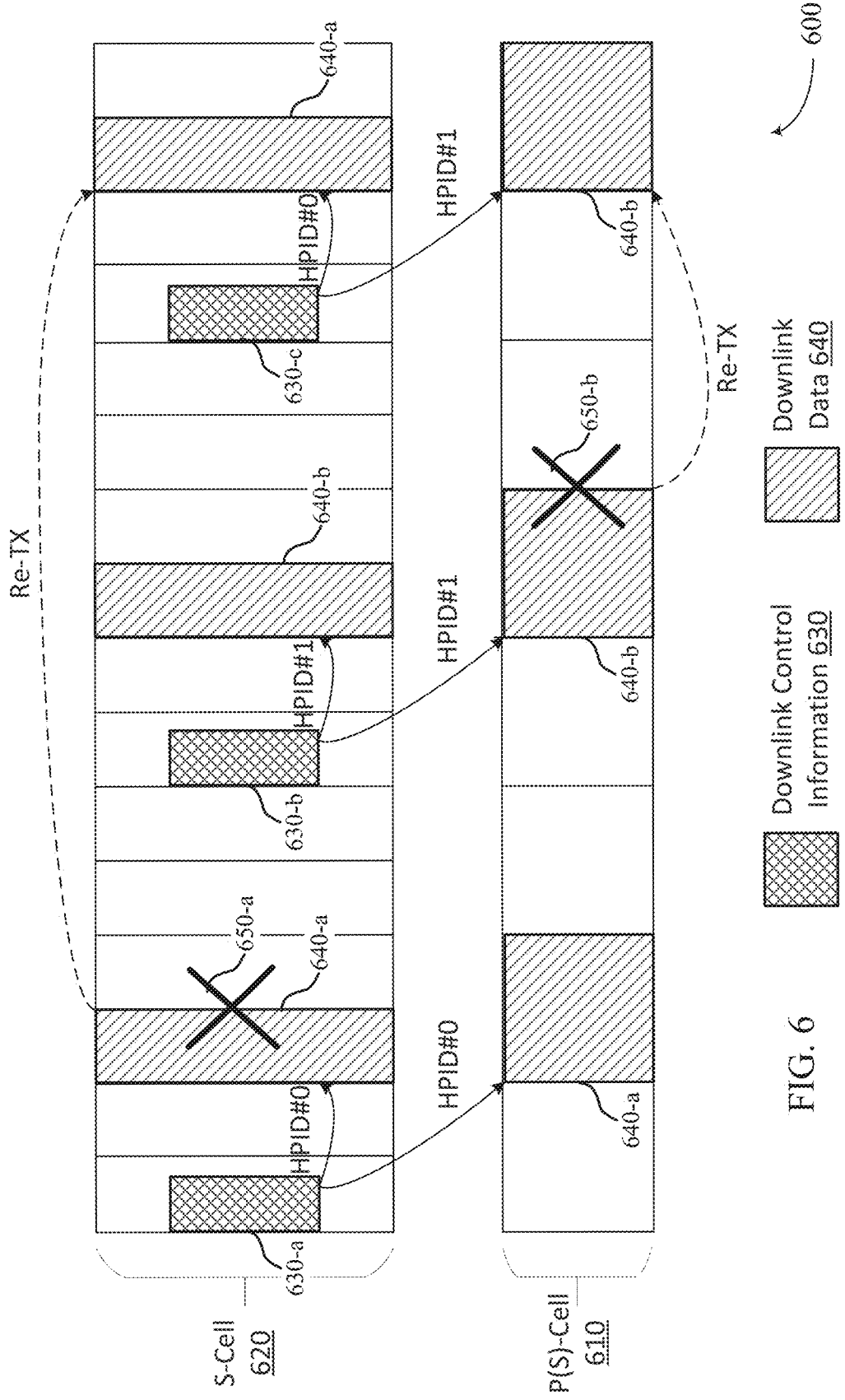
FIG. 6 illustrates a scheduling/transmission configuration of a wireless communication method according to some aspects of the present disclosure.

FIG. 6 illustrates a scheduling/transmission configuration 600 of a wireless communication method according to some aspects of the present disclosure. The scheduling/transmission configuration 600 illustrates multi-carrier scheduling between a P(S) Cell 610 and an S Cell 620. In some instances, the P(S) Cell 610 is a dynamic spectrum sharing (DSS) cell. In some instances, the S Cell 620 is a non-DSS cell. As shown, a DCI 630-a transmitted over a control channel (e.g., PDCCH) of the S Cell 620 is utilized to schedule downlink data 640-a over a data channel (e.g., PDSCH) of the P(S) Cell 610 and downlink data 640-a over a data channel (e.g., PDSCH) of the S Cell 620. In some instances, the data 640-a transmitted over the P(S) Cell 610 may be the same, or at least partially the same, as the downlink data 640-a transmitted over the S Cell 220. In some instances, the data 640-a transmitted over the P(S) Cell 610 may be different, or at least partially different, from the downlink data 640-a transmitted over the S Cell 620.

In some instances, a DCI message can include a first hybrid automatic repeat request (HARQ) process ID associated with a first component carrier and a second HARQ process ID associated with a second component carrier. For example, FIG. 6 illustrates DCI 630-*a* having HARQ process IDs for each of the P(S) Cell 610 and the S Cell 620. In particular, DCI 630-*a* shows both the P(S) Cell 610 and the S Cell 620 having the same value (e.g., HPID #0). Similarly, FIG. 6 shows a DCI 640-*a*—with associated downlink data 640-*b* scheduled over the P(S) Cell 610 and the S Cell 620—having HARQ process IDs for each of the P(S) Cell 610 and the S Cell 620. In particular, DCI 640-*a* shows both the P(S) Cell 610 and the S Cell 620 having the same value (e.g., HPID #1), but a different value than DCI 630-*a*.

In some instances, a UE may not receive, be able to decode, and/or otherwise have issues receiving scheduled downlink data that results in the UE transmitting a negative acknowledgement (NACK) to the base station indicating that the scheduled downlink data was not properly received by the UE. In some instances, the NACK is part of a HARQ process for a component carrier, which may be at least partially defined by the HARQ process ID included in the DCI. For example, FIG. 6 illustrates a situation where downlink data 640-*a* is not properly received over the data channel of the S Cell 620 (as indicated by 650-*a*) and downlink data 640-*b* is not properly received over the data channel of the P(S) Cell 610 (as indicated by 650-*b*). In accordance with the present disclosure, a single DCI (e.g., DCI 630-*c*) can be utilized to schedule retransmission of the downlink data 640-*a* over the S Cell 620 and the downlink data 640-*b* over the P(S) Cell 610. That is, the downlink data scheduled by the DCI 630-*c* can include a first retransmission associated with a first HARQ process ID (e.g., downlink data 640-*a* associated with HPID #0 for the S Cell 620) and a second retransmission associated with a different HARQ process ID (e.g., downlink data 640-*b* associated with HPID #1 for the S Cell 610). Having separate HARQ process IDs for each component carrier in the DCI can allow retransmissions to be scheduled on each carrier separately. This can facilitate scheduling, via a single DCI, retransmission of data associated with a first HARQ process on a first carrier and retransmission of data associated with a second HARQ process on a second, different carrier. This can improve efficiency and reduce latency for the associated data communications.

Figure 7:
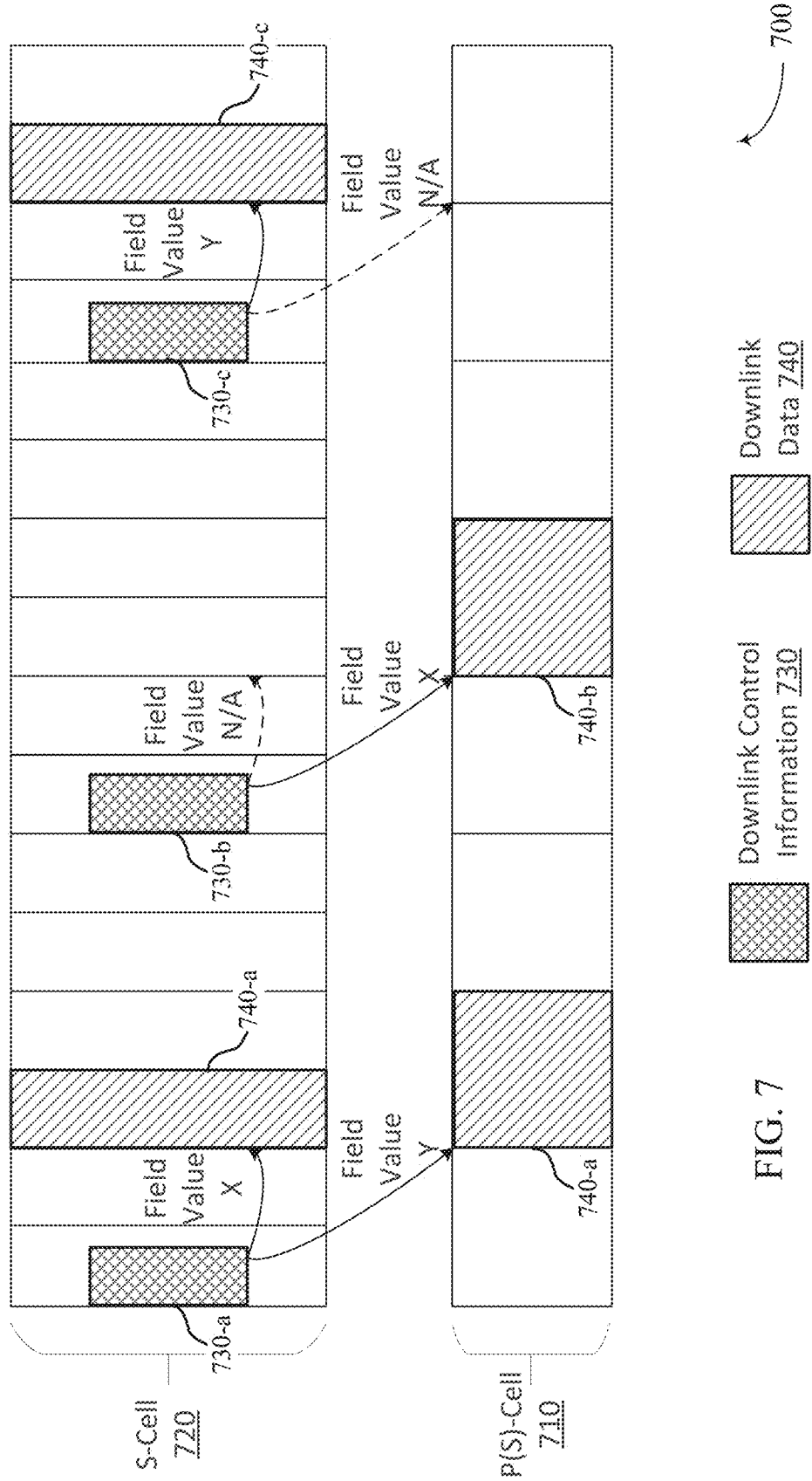
FIG. 7 illustrates a scheduling/transmission configuration of a wireless communication method according to some aspects of the present disclosure.

FIG. 7 illustrates a scheduling/transmission configuration 700 of a wireless communication method according to some aspects of the present disclosure. The scheduling/transmission configuration 700 illustrates multi-carrier and/or cross-carrier scheduling between a P(S) Cell 710 and an S Cell 720. In some instances, the P(S) Cell 710 is a dynamic spectrum sharing (DSS) cell. In some instances, the S Cell 720 is a non-DSS cell. As shown, a DCI 730-*a* transmitted over a control channel (e.g., PDCCH) of the S Cell 720 schedules downlink data 740-*a* over a data channel (e.g., PDSCH) of the P(S) Cell 710 and downlink data 740-*a* over a data channel (e.g., PDSCH) of the S Cell 720. In some instances, the data 740-*a* transmitted over the P(S) Cell 710 may be the same, or at least partially the same, as the downlink data 740-*a* transmitted over the S Cell 720. In some instances, the data 740-*a* transmitted over the P(S) Cell 710 may be different, or at least partially different, from the downlink data 740-*a* transmitted over the S Cell 720.

In some instances, at least one field of the DCI 730-*a* indicates whether the downlink data 740-*a* is scheduled over a single component carrier or multiple component carriers.

In some instances, the DCI includes a first field associated with a first component carrier (e.g., P(S) Cell 710) and a second field associated with a second component carrier (e.g., S Cell 720). The values of the first and second fields can indicate that the downlink data communication is scheduled over multiple component carriers. For example, the value of a field may indicate that data is scheduled for transmission over that component carrier. Accordingly, when the values of the first and second fields each indicate that data is scheduled for transmission, the DCI indicates that the downlink data is scheduled over multiple component carriers. For example, FIG. 7 illustrates an example where DCI 730-*a* includes a field value for the S Cell 720 (e.g., Field Value X) that indicates downlink data 740-*a* will be transmitted over the S Cell 720 and a field value for the P(S) Cell 710 (e.g., Field Value Y) that indicates downlink data 740-*a* will be transmitted over the P(S) Cell 710. In some instances, the UE can determine the downlink data communication is scheduled over multiple component carriers based on the first field and the second field having values that are assigned for a primary purpose of the first and second fields. For example, a field may be associated with a frequency domain resource allocation (FDRA) and the value may be associated with a data transmission (e.g., one or more "one" values in a bitmap for RA Type 0, one or more "zero" values for RC Type 1, etc.).

In some instances, the value of the field can indicate that no data is scheduled for transmission over the associated component carrier. Accordingly, when the value one of the first or second fields indicates that data is not scheduled for transmission, the DCI indicates that the downlink data is scheduled over a single component carrier. For example, in some instances a DCI indicates the downlink data communication is scheduled over a single component carrier based on at least one of the first field or the second field having a value that is not assigned for a primary purpose of the field. For example, a field may be associated with a frequency domain resource allocation (FDRA) and the value may not be assigned to or have an associated FDRA (e.g., all zeros for RA Type 0, all ones for RC Type 1, etc.). A value that is not assigned for a primary purpose of the field may include a value that is outside of the defined range of available values for the field, a value that does not have meaning in the context of the field, a value for an unused field, and/or is a value otherwise distinguishable from the values used for the primary purpose of the field.

FIG. 7 illustrates this approach of using a value that is not assigned for a primary purpose of a field. For example, DCI 730-*b* includes a field value for the S Cell 720 (e.g., Field Value N/A) that indicates downlink data will not be transmitted over the S Cell 720 and a field value for the P(S) Cell 710 (e.g., Field Value X) that indicates downlink data 740-*a* will be transmitted over the P(S) Cell 710. In this manner, the DCI 730-*b* indicates single-carrier scheduling over P(S) cell 710. As another example, DCI 730-*c* includes a field value for the S Cell 720 (e.g., Field Value Y) that indicates downlink data 740-*c* will be transmitted over the S Cell 720 and a field value for the P(S) Cell 710 (e.g., Field Value N/A) that indicates downlink data will not be transmitted over the P(S) Cell 710. In this manner, the DCI 730-*c* indicates single-carrier scheduling over S cell 720.

Figure 8:
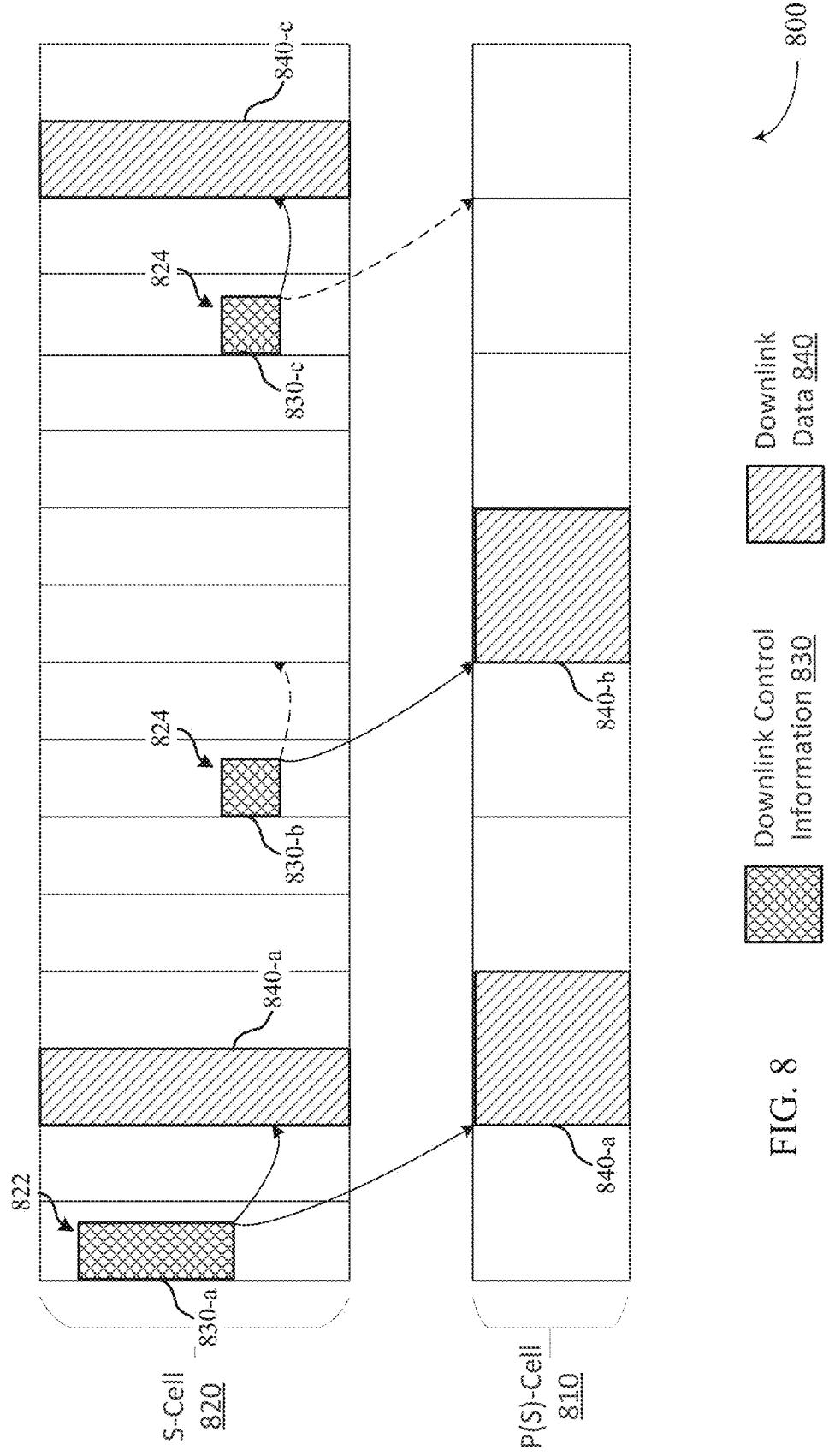
FIG. 8 illustrates a scheduling/transmission configuration of a wireless communication method according to some aspects of the present disclosure.

FIG. 8 illustrates a scheduling/transmission configuration 800 of a wireless communication method according to some aspects of the present disclosure. The scheduling/transmission configuration 800 illustrates multi-carrier and/or cross-carrier scheduling between a P(S) Cell 810 and an S Cell 820. In some instances, the P(S) Cell 810 is a dynamic spectrum sharing (DSS) cell. In some instances, the S Cell 820 is a non-DSS cell. As shown, a DCI 830-*a* transmitted over a control channel (e.g., PDCCH) of the S Cell 820 schedules downlink data 840-*a* over a data channel (e.g., PDSCH) of the P(S) Cell 810 and downlink data 840-*a* over a data channel (e.g., PDSCH) of the S Cell 820. In some instances, the data 840-*a* transmitted over the P(S) Cell 810 may be the same, or at least partially the same, as the downlink data 840-*a* transmitted over the S Cell 820. In some instances, the data 840-*a* transmitted over the P(S) Cell 810 may be different, or at least partially different, from the downlink data 840-*a* transmitted over the S Cell 820.

In some instances, the search space in which the DCI 830-*a* is transmitted indicates whether the downlink data 840-*a* is scheduled over a single component carrier or multiple component carriers. In this regard, a first search space can be associated with the single component carrier and a second search space can associated with the multiple component carriers. If the DCI is transmitted in the first search space associated with the single component carrier, then a UE receiving the DCI can determine the associated downlink data is scheduled over the single component carrier and monitor for the data accordingly. Similarly, if the DCI message is transmitted in the second search space associated with the multiple component carriers, then a UE receiving the DCI can determine the associated downlink data is scheduled over the multiple component carriers and monitor for the data accordingly. The first search space (associated with the single component carrier) and the second search space (associated with multiple component carriers) may be completely separate or partially overlap. Further, in some instances separate search spaces may be assigned for each single component carrier such that a UE can determine which single component carrier the downlink data will be transmitted on based on the search space in which a single-carrier DCI is received. In some instances, a UE receives information regarding the assigned search space(s) and any association of the search space(s) to single-carrier and/or multi-carrier scheduling via an RRC communication (e.g., RRC configuration).

In the example of FIG. 8, DCI 830-*a* is transmitted in a search space 822 that is associated with multi-carrier scheduling. The DCI 830-*a* may include a carrier indicator field (CIF) value that indicates the downlink data 840-*a* is scheduled for multi-carrier transmission. As shown, the DCI 830-*a* is transmitted in the multi-carrier search space 822 and schedules downlink data 840-*a* on both the P(S) Cell 810 and the S Cell 820. DCI 830-*b* is transmitted in a search space 824 that is associated with single-carrier scheduling. The DCI 830-*b* may include CIF value that indicates the downlink data 840-*b* is scheduled for single-carrier transmission. As shown, the DCI 830-*b* is transmitted in the single-carrier search space 824 and schedules downlink data 840-*a* only on the P(S) Cell 810. Similarly, DCI 830-*c* is transmitted in the single-carrier search space 824 and schedules downlink data 840-*a* only on the S Cell 820. The DCI 830-*c* may also include a CIF value that indicates the downlink data 840-*c* is scheduled for single-carrier transmission.

Figure 9:
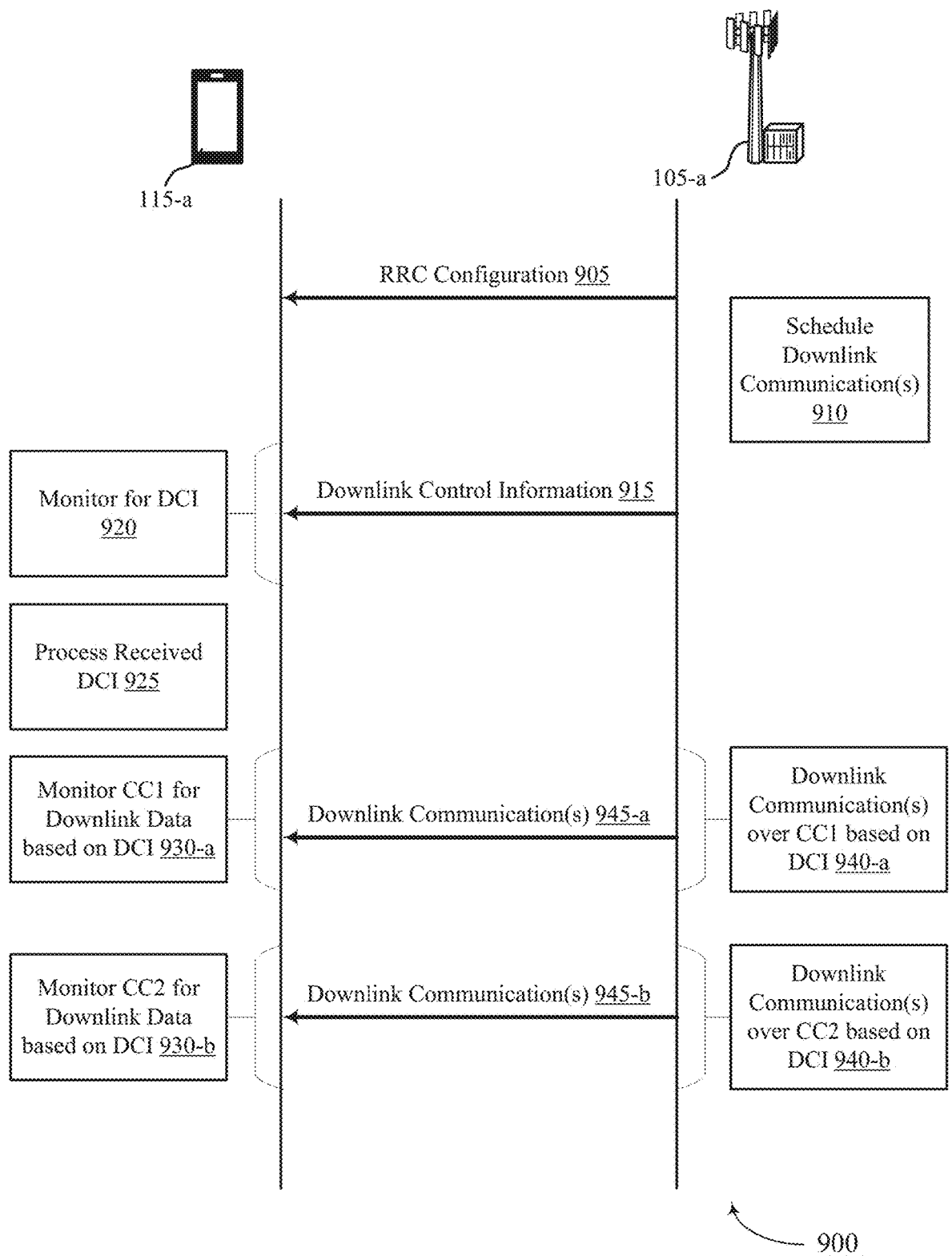
FIG. 9 illustrates a signal diagram illustrating a cross-carrier and/or multi-carrier scheduling technique according to some aspects of the present disclosure.

FIG. 9 illustrates a signal diagram illustrating a cross-carrier and/or multi-carrier scheduling technique 900 between a base station 105-*a* and a UE 115-*a* according to some aspects of the present disclosure. As shown, at step 905 the base station 105-*a* may transmit a radio resource control (RRC) configuration to the UE 115-*a*. In some instances, the RRC configuration may include DCI configuration information. For example, the DCI configuration may provide information regarding the search space(s) in which DCI may be transmitted (including any association of the search space(s) to single-carrier and/or multi-carrier scheduling), DCI format(s) and/or field(s), and/or other information to facilitate the UE 115-*a* monitoring for and receiving DCI from the base station 105-*a*.

At step 910, the base station 105-*a* schedules downlink communication(s). The base station 105-*a* may schedule the downlink communication(s) using single-carrier, multi-carrier, and/or cross-carrier scheduling in accordance with aspects of the present disclosure (see, e.g., FIGS. 2A, 2B, 6, 7, and 8).

At step 915, the base station 105-*a* transmits DCI to the UE 115-*a* in accordance with aspects of the present disclosure (see, e.g., FIGS. 2A, 2B, 6, 7, and 8).

At step 920, the UE 115-*a* monitors for the DCI from the base station 105-*a* in accordance with aspects of the present disclosure (see, e.g., FIGS. 2A, 2B, 6, 7, and 8). In some instances, the UE 115-*a* monitors for the DCI over a control channel (e.g., PDCCH) based on the DCI configuration information received in the RRC configuration at step 905.

At step 925, the UE 115-*a* processes the received DCI in accordance with aspects of the present disclosure (see, e.g., FIGS. 2A, 2B, 6, 7, and 8). In this regard, the UE 115-*a* may process the DCI to determine whether downlink data communications will be transmitted over a single carrier or multiple carriers. For example, as described in various aspects of the present disclosure, the UE 115-*a* may utilize the DCI format, the search space in which the DCI is received, one or more field values of the DCI, one or more other characteristics of the DCI, and/or combinations thereof to determine whether the downlink data communications associated with the DCI will be transmitted over a single carrier or multiple carriers.

At step 930-*a*, the UE 115-*a* monitors for downlink data over a first component carrier (CC1) based on the DCI received at step 915. Accordingly, if the DCI indicates that data is to be transmitted over CC1, then the UE 115-*a* will actively monitor the data channel (PDSCH) of CC1 for the downlink data communication during step 930-*a*. However, if the DCI indicates that data will not be transmitted over CC 1, then the UE 115-*a* will not monitor the data channel (PDSCH) of CC1 during step 930-*a*. Similarly, at step 930-*b*, the UE 115-*a* monitors for downlink data over a second component carrier (CC2) based on the DCI received at step 915. If the DCI indicates that data is to be transmitted over CC2, then the UE 115-*a* will actively monitor the data channel (PDSCH) of CC2 for the downlink data communication during step 930-*a*. However, if the DCI indicates that data will not be transmitted over CC2, then the UE 115-*a* will not monitor the data channel (PDSCH) of CC2 during step 930-*a*. Steps 930-*a* and 930-*b* may be performed separately, simultaneously, and/or partially overlapping.

At step 940-*a*, the base station 105-*a* transmits downlink data over the first component carrier (CC1) in accordance with the DCI transmitted at step 915. Accordingly, if the DCI indicates that data is to be transmitted over CC1, then the base station 105-*a* will transmit the downlink communication over the data channel (PDSCH) of CC1 during step 940-*a*. However, if the DCI indicates that data will not be transmitted over CC1, then the base station 105-*a* will not transmit any data over the data channel (PDSCH) of CC1 during step 940-*a*. Similarly, at step 940-*b*, the base station 105-*a* transmits downlink data over the second component carrier (CC2) in accordance with the DCI transmitted at step 915. If the DCI indicates that data is to be transmitted over CC2, then the base station 105-*a* will transmit the downlink communication over the data channel (PDSCH) of CC2 during step 940-*b*. However, if the DCI indicates that data will not be transmitted over CC2, then the base station 105-*a* will transmit the downlink communication over the data channel (PDSCH) of CC2 during step 940-*b*. Steps 940-*a* and 940-*b* may be performed separately, simultaneously, and/or partially overlapping.

Figure 10:
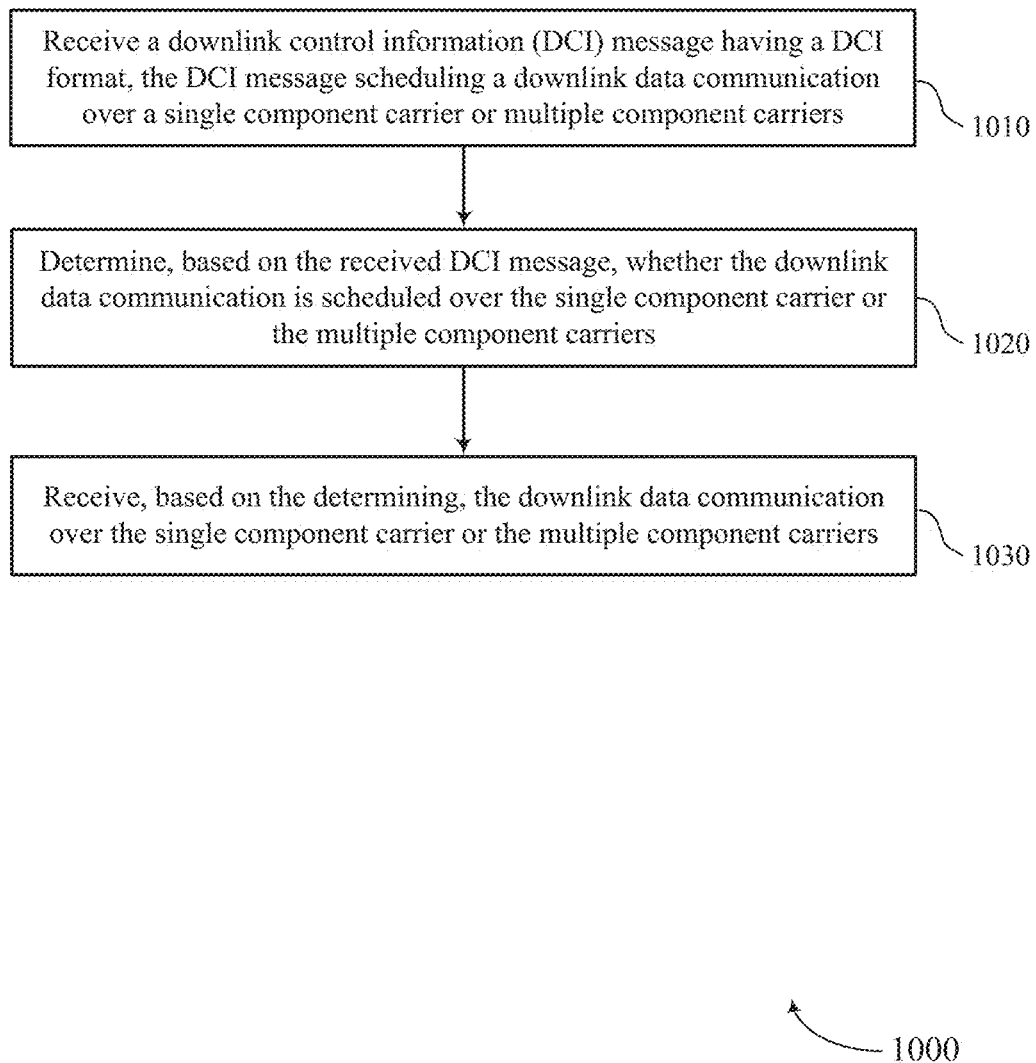
FIG. 10 illustrates a flow diagram of a wireless communication method according to some aspects of the present disclosure.

FIG. 10 is a flow diagram of a communication method 1000 according to some aspects of the present disclosure. Aspects of the method 1000 can be executed by a wireless communication device, such as the UEs 115 and/or 400 utilizing one or more components, such as the processor 402, the memory 404, the downlink scheduling and control module 408, the transceiver 410, the modem 412, the one or more antennas 416, and various combinations thereof. As illustrated, the method 1000 includes a number of enumerated steps, but the method 1000 may include additional steps before, after, and in between the enumerated steps. For example, in some instances one or more aspects of techniques 200, 250, and/or 900; DCI formats 300, 310, 320, and/or 330; scheduling/transmission configurations 600, 700, and/or 800 may be implemented as part of method 1000. In some instances, one or more of the enumerated steps may be omitted or performed in a different order.

At step 1010, the method 1000 includes receiving a downlink control information (DCI) message having a DCI format, the DCI message scheduling a downlink data communication over a single component carrier or multiple component carriers. The DCI message may be received over a control channel (e.g., PDCCH) of a P Cell, a P(S) Cell, and/or an S Cell. In some instances, the DCI message is utilized for cross-carrier scheduling. For example, a scheduling cell (e.g., P Cell, a P(S) Cell, and/or an S Cell) uses the DCI transmitted over the control channel (e.g., PDCCH) of the scheduling cell to schedule data on a data channel (e.g., PDSCH) of a different cell (e.g., P Cell, a P(S) Cell, and/or an S Cell). In some instances, the DCI message is utilized for multi-carrier scheduling. For example, a single DCI transmitted over the PDCCH of the scheduling cell can be used to schedule data for data transmissions on multiple cells, including the scheduling cell and a different cell. In some instances, the DCI message is utilized for cross-carrier and multi-carrier scheduling. Also, the cross-carrier and/or multi-carrier scheduling of the DCI received at step 1010 can be utilized in the context of DSS. For example, a non-DSS cell can use a single DCI to schedule data on a DSS cell and/or the non-DSS cell. The cross-carrier and/or multi-carrier scheduling of the DCI received at step 1010 can also be utilized in the context of cross-carrier scheduling for carrier aggregation.

At step 1020, the method 1000 includes determining, based on the received DCI message, whether the downlink data communication is scheduled over the single component carrier or the multiple component carriers. In this regard, the UE may utilize one or more characteristics of the DCI message (e.g., field value(s), search space(s), format, etc.) to determine whether the downlink data communication is scheduled over the single component carrier or the multiple component carriers.

In some instances, determining whether the downlink data communication is scheduled over the single component carrier or the multiple component carriers at step 1020 includes determining whether the DCI message has a first format associated with the single component carrier or a second format associated with the multiple component carriers. That is, a first DCI format can be used for single-carrier scheduling and a second, different DCI format can be used for multi-carrier scheduling. In this regard, the UE may determine, at step 1020, whether data is scheduled for transmission over a single carrier or multiple carriers based on the format of the received DCI.

In some instances, determining whether the downlink data communication is scheduled on the single component carrier or the multiple component carriers at step 1020 includes determining whether the received DCI message was received in a first search space associated with the single component carrier or a second search space associated with the multiple component carriers (see, e.g., FIG. 8). If the DCI message is received in the first search space associated with the single component carrier, then the UE can determine the associated data is scheduled over the single component carrier and monitor for the data accordingly. Similarly, if the DCI message is received in the second search space associated with the multiple component carriers, then the UE can determine the associated data is scheduled over the multiple component carriers and monitor for the data accordingly. The first search space (associated with the single component carrier) and the second search space (associated with multiple component carriers) may be completely separate or partially overlap.

In some instances, determining whether the downlink data communication is scheduled over the single component carrier or the multiple component carriers at step 1020 includes determining whether at least one field of the DCI message indicates the downlink data communication is scheduled over the single component carrier or the multiple component carriers (see, e.g., FIG. 7). In some instances, the DCI includes a first field associated with a first component carrier and a second field associated with a second component carrier. The UE may determine the downlink data communication is scheduled over the single component carrier based on a value of the first field or the second field. For example, the value of the field may indicate to the UE that no data is scheduled for transmission over that component carrier. In some instances, the UE may determine the downlink data communication is scheduled over the single component carrier based on at least one of the first field or the second field having a value that is not assigned for a primary purpose of the field. For example, a field may be associated with a frequency domain resource allocation (FDRA) and the value may not be assigned to or have an associated FDRA (e.g., all zeros for RA Type 0, all ones for RC Type 1, etc.).

Similarly, the UE may determine the downlink data communication is scheduled over multiple component carriers based on the values of the first and second fields. For example, the value of the field may indicate to the UE that data is scheduled for transmission over that component carrier. Accordingly, when the values of the first and second fields each indicate that data is scheduled for transmission, the UE can determine that the data is scheduled over multiple component carriers. In some instances, the UE may determine the downlink data communication is scheduled over multiple component carriers based on the first field and the second field having values that are assigned for a primary purpose of the first and second fields.

In some instances, the DCI message includes a first hybrid automatic repeat request (HARQ) process ID associated with a first component carrier and a second HARQ process ID associated with a second component carrier (see, e.g., FIG. 6). In this regard, the downlink data communication scheduled by the DCI message can include a first retransmission associated with the first HARQ process ID and a second retransmission associated with the second HARQ process ID. Having separate HARQ process IDs for each component carrier can allow retransmissions to be scheduled on each carrier separately. This can facilitate scheduling, via a single DCI, retransmission of data associated with a first HARQ process on a first carrier and retransmission of data associated with a second HARQ process on a second, different carrier. This can improve efficiency and reduce latency for the associated data communications. In some instances, the DCI message includes a HARQ process ID associated with both the first component carrier and the second component carrier. That is, a single HARQ process ID can be used for both the first and second component carriers. Having a common HARQ process ID can reduce the size of the DCI by having a joint field instead of two separate fields in the DCI (see, e.g., FIG. 3D).

At step 1030, the method 1000 includes receiving, based on the determining, the downlink data communication over the single component carrier or the multiple component carriers. The downlink data communication may be received over a PDSCH of a P Cell, a P(S) Cell, and/or an S Cell. In some instances, the downlink data communication is received over the data channel of a cell that is different than the cell over which the DCI message was received (at step 1010). In some instances, the downlink data communication is received over both a data channel of the cell over which the DCI message was received and a data channel of a different cell. In some instances, the downlink data communication is received over a DSS cell. In some instances, the DCI message is received over a physical downlink control channel (PDCCH) of a secondary cell and at least a first part of the downlink data communication signal is received over a physical downlink shared channel (PDSCH) of a primary cell (e.g., a P Cell and/or a P(S) Cell). A second part of the downlink data communication (e.g., for multi-carrier scheduling) may be received over a PDSCH of the secondary cell.

Figure 11:
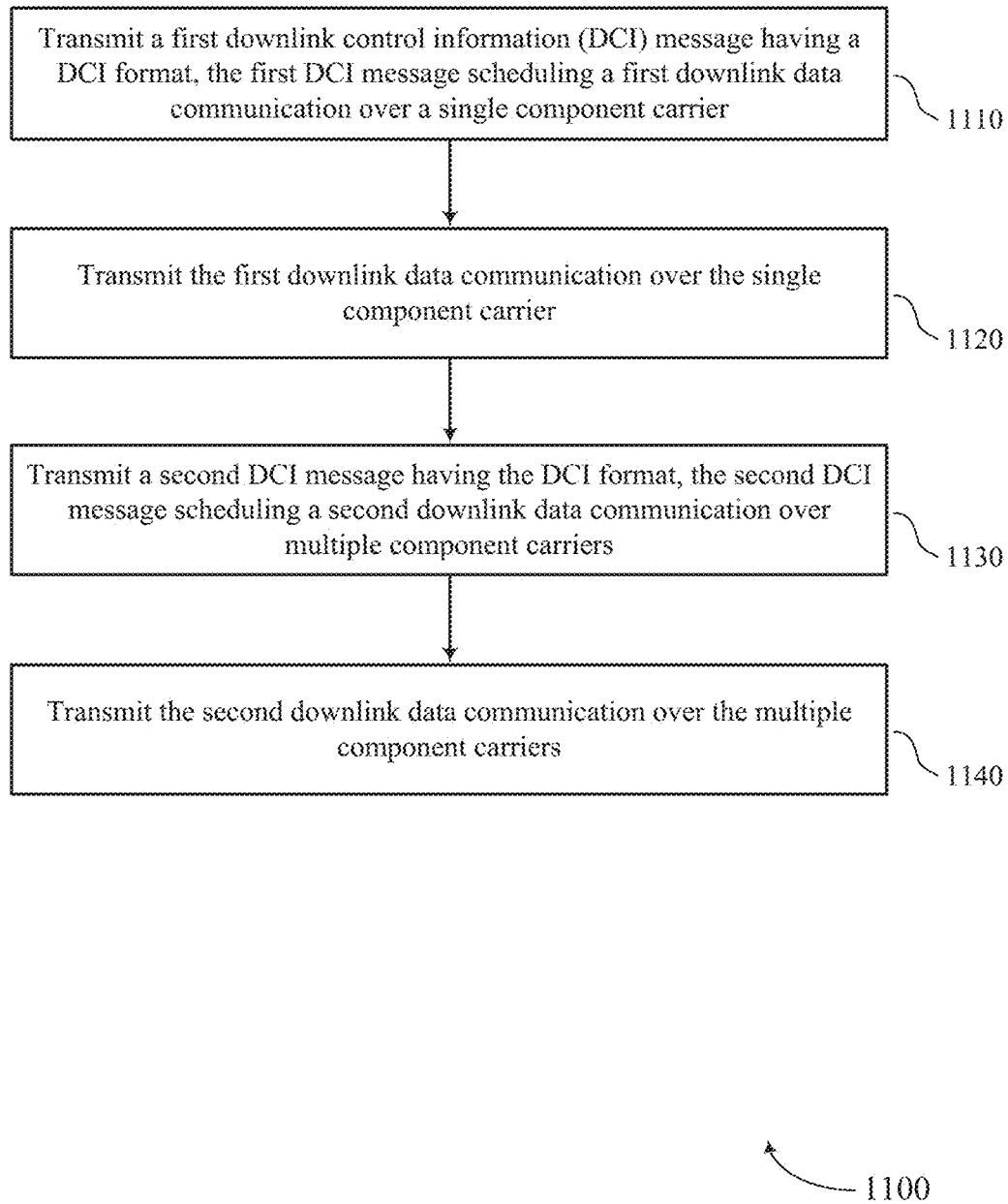
FIG. 11 illustrates a flow diagram of a wireless communication method according to some aspects of the present disclosure.

FIG. 11 is a flow diagram of a communication method 1100 according to some aspects of the present disclosure. Aspects of the method 1100 can be executed by a wireless communication device, such as the BSs 105 and/or 500 utilizing one or more components, such as the processor 502, the memory 504, the downlink scheduling and control module 508, the transceiver 510, the modem 512, the one or more antennas 516, and various combinations thereof. As illustrated, the method 1100 includes a number of enumerated steps, but the method 1100 may include additional steps before, after, and in between the enumerated steps. For example, in some instances one or more aspects of techniques 200, 250, and/or 900; DCI formats 300, 310, 320, and/or 330; scheduling/transmission configurations 600, 700, and/or 800 may be implemented as part of method 1100. In some instances, one or more of the enumerated steps may be omitted or performed in a different order.

At step 1110, the method 1100 includes transmitting a first downlink control information (DCI) message having a DCI format, the first DCI message scheduling a first downlink data communication over a single component carrier. The DCI message may be transmitted, at step 1110, over a control channel (e.g., PDCCH) of a P Cell, a P(S) Cell, and/or an S Cell. In some instances, the DCI message is utilized by the base station for cross-carrier scheduling. For example, the base station may use a scheduling cell (e.g., P Cell, a P(S) Cell, and/or an S Cell) to transmit the DCI over the control channel (e.g., PDCCH) of the scheduling cell to schedule data on a data channel (e.g., PDSCH) of a different cell (e.g., P Cell, a P(S) Cell, and/or an S Cell). The base station can utilize the cross-carrier scheduling of the DCI transmitted at step 1110 in the context of DSS. For example, the base station may transmit a single DCI over a non-DSS cell to schedule data on a DSS cell. The cross-carrier scheduling of the DCI transmitted at step 1110 can also be utilized in the context of cross-carrier scheduling for carrier aggregation.

In some instances, the base station utilizes different DCI formats to indicate single-carrier scheduling versus multi-carrier scheduling. For example, a first format of the DCI message can be associated with a single component carrier and a second format of the DCI message can be associated with multiple component carriers. That is, a first DCI format can be used for single-carrier scheduling and a second, different DCI format can be used for multi-carrier scheduling. Accordingly, the base station can determine and/or generate the format for the DCI message that will be transmitted at step 1110 based on the scheduled data transmission (e.g., single carrier format versus multi-carrier format). In some instances, the format of the DCI message transmitted at step 1110 can be used by the receiving UE to determine the scheduled data will be transmitted over a single carrier.

In some instances, the first DCI message is transmitted, at step 1110, in a first search space associated with the single component carrier. In this regard, the base station may utilize different search spaces to transmit the DCI to indicate single-carrier scheduling versus multi-carrier scheduling (see, e.g., FIG. 8). For example, a first search space may be associated with a single component carrier and a second search space associated with multiple component carriers. Accordingly, when data is scheduled for transmission over a single carrier the base station can transmit the DCI message in the first search space associated with the single component carrier. The UE can determine, based on receiving the DCI message in the first search space, that the associated data is scheduled over the single component carrier and monitor for the data accordingly. Similarly, when data is scheduled for transmission over multiple carriers the base station can transmit the DCI message in the second search space associated with the multiple component carriers. The UE can determine, based on receiving the DCI message in the second search space, that the associated data is scheduled over the multiple component carriers and monitor for the data accordingly. The first search space (associated with the single component carrier) and the second search space (associated with multiple component carriers) may be completely separate or partially overlap.

In some instances, the first DCI message includes at least one field indicating the first downlink data communication is scheduled over the single component carrier. For example, the DCI may include a first field associated with a first component carrier and a second field associated with a second component carrier. The base station may indicate the downlink data communication is scheduled over the single component carrier based on a value of the first field or the second field. For example, the base station may set the value of the field to indicate to the UE that no data is scheduled for transmission over that component carrier. In some instances, the base station may indicate that a downlink data communication is scheduled over a single component carrier based on at least one of the first field or the second field having a value that is not assigned for a primary purpose of the field. For example, a field may be associated with a frequency domain resource allocation (FDRA) and the value used by the base station may not be assigned to or have an associated FDRA (e.g., all zeros for RA Type 0, all ones for RC Type 1, etc.). Accordingly, in some instances, when the first field or the second field has a value that is not assigned for a primary purpose of the field, the DCI transmitted at step 1110 indicates that the downlink data communication is scheduled over the single component carrier.

At step 1120, the method 1100 includes transmitting the first downlink data communication over the single component carrier. The downlink data communication may be transmitted over a PDSCH of a P Cell, a P(S) Cell, and/or an S Cell. In some instances, the downlink data communication is transmitted over the data channel of a cell that is different than the cell over which the DCI message was transmitted (at step 1110). In some instances, the downlink data communication is transmitted over a DSS cell. In some instances, the DCI message is transmitted (at step 1110) over a physical downlink control channel (PDCCH) of a secondary cell and the downlink data communication signal is transmitted (at step 1120) over a physical downlink shared channel (PDSCH) of a primary cell (e.g., a P Cell and/or a P(S) Cell).

At step 1130, the method 1100 includes transmitting a second DCI message, the second DCI message scheduling a second downlink data communication over multiple component carriers. The DCI message may be transmitted, at step 1130, over a control channel (e.g., PDCCH) of a P Cell, a P(S) Cell, and/or an S Cell. In some instances, the DCI message transmitted at step 1130 is transmitted over the same cell as the DCI message transmitted at step 1110. In some instances, the DCI message is utilized by the base station for multi-carrier scheduling. For example, a single DCI transmitted, at step 1130, over the control channel (e.g., PDCCH) of a scheduling cell can be used to schedule data for data transmissions on multiple cells, including the scheduling cell and a different cell. In some instances, the DCI message transmitted at step 1130 is utilized by the base station for cross-carrier and multi-carrier scheduling. Also, the cross-carrier and/or multi-carrier scheduling of the DCI transmitted at step 1010 can be utilized in the context of DSS. For example, the base station may utilize a non-DSS cell to transmit a single DCI, at step 1130, to schedule data on a DSS cell and the non-DSS cell.

In some instances, the DCI message transmitted at step 1130 has the same DCI format as the DCI message transmitted at step 1110. That is, the same DCI format can be utilized by the base station for both single-carrier scheduling and multi-carrier scheduling. In other instances, DCI message transmitted at step 1130 has a different DCI format than the DCI message transmitted at step 1110. For example, the base station can utilize different DCI formats to indicate single-carrier scheduling versus multi-carrier scheduling. Accordingly, the base station can determine and/or generate the format for the DCI message that will be transmitted at step 1130 based on the scheduled data transmission (e.g., single carrier format versus multi-carrier format). Accordingly, in some instances the format of the DCI message transmitted at step 1130 can be used by the receiving UE to determine the scheduled data will be transmitted over multiple carriers.

In some instances, the second DCI message includes transmitting the second DCI message in a second search space associated with the multiple component carriers. As discussed above, the base station may utilize different search spaces to indicate single-carrier scheduling versus multi-carrier scheduling (see, e.g., FIG. 8). For example, a first search space may be associated with a single component carrier and a second search space associated with multiple component carriers. Accordingly, when data is scheduled for transmission over multiple carriers the base station can transmit the DCI message in the second search space associated with the multiple component carriers. The UE can determine, based on receiving the DCI message in the second search space, that the associated data is scheduled over the multiple component carriers and monitor for the data accordingly. The first search space (associated with the single component carrier) and the second search space (associated with multiple component carriers) may be completely separate or partially overlap.

In some instances, the second DCI message includes at least one field indicating the second downlink data communication is scheduled over the multiple component carriers. For example, the DCI may include a first field associated with a first component carrier and a second field associated with a second component carrier. The base station may indicate the downlink data communication is scheduled over multiple component carriers based on a value of the first field and/or the second field. For example, the base station may set the value of the field to indicate to the UE that data is scheduled for transmission over that component carrier. In some instances, the base station may utilize a value that is assigned for a primary purpose of the field to indicate that data will be transmitted over the carrier. For example, a field may be associated with a frequency domain resource allocation (FDRA) and the value may be assigned to or have an associated FDRA. Accordingly, in some instances, when the first field and the second field each has a value that is assigned for a primary purpose of the field, the DCI transmitted at step 1130 indicates that the second downlink data communication is scheduled over the multiple component carriers.

At step 1140, the method 1100 includes transmitting the second downlink data communication over the multiple component carriers. The downlink data communication may be transmitted over a PDSCH of a P Cell, a P(S) Cell, and/or an S Cell. In some instances, at least a portion of the downlink data communication is transmitted over the data channel of a cell that is different than the cell over which the DCI message was transmitted (at step 1130). In some instances, at least a portion of the downlink data communication is transmitted over a DSS cell. In some instances, the DCI message is transmitted (at step 1130) over a physical downlink control channel (PDCCH) of a secondary cell and the downlink data communication signal is transmitted (at step 1140) on the multiple component carriers, including at least a first part over a physical downlink shared channel (PDSCH) of a primary cell and at least a second part over a PDSCH of the secondary cell.

In some instances, the DCI message transmitted at step 1130 includes a first hybrid automatic repeat request (HARQ) process ID associated with a first component carrier and a second HARQ process ID associated with a second component carrier. In this regard, the second downlink data communication transmitted at step 1140 can include a first retransmission associated with the first HARQ process ID and a second retransmission associated with the second HARQ process ID. In this manner, the base station can schedule, via a single DCI, retransmission of data associated with a first HARQ process on a first carrier and retransmission of data associated with a second HARQ process on a second, different carrier. This can improve efficiency and reduce latency for the associated data communications. In some instances, the DCI message transmitted at step 1130 includes a HARQ process ID associated with both the first component carrier and the second component carrier. That is, the base station can utilize a single HARQ process ID in the DCI for both the first and second component carriers. Utilizing a common HARQ process ID can reduce the size of the DCI by having a joint field instead of two separate fields in the DCI (see, e.g., FIG. 3D).

Further aspects of the present disclosure include the following:

1. A method of wireless communication performed by a user equipment, the method comprising:

receiving a downlink control information (DCI) message having a DCI format, the DCI message scheduling a downlink data communication over a single component carrier or multiple component carriers;

determining, based on the received DCI message, whether the downlink data communication is scheduled over the single component carrier or the multiple component carriers; and receiving, based on the determining, the downlink data communication over the single component carrier or the multiple component carriers.

2. The method of clause 1, wherein the determining whether the downlink data communication is scheduled over the single component carrier or the multiple component carriers includes:

determining whether the DCI message has a first format associated with the single component carrier or a second format associated with the multiple component carriers.

3. The method of any of clauses 1-2, wherein the determining whether the downlink data communication is scheduled on the single component carrier or the multiple component carriers includes:

determining whether the received DCI message was received in a first search space associated with the single component carrier or a second search space associated with the multiple component carriers.

4. The method of clause 3, wherein the receiving the DCI message includes receiving the DCI message in the first search space associated with the single component carrier.

5. The method of clause 3, wherein the receiving the DCI message includes receiving the DCI message in the second search space associated with the multiple component carriers.

6. The method of any of clauses 1-5, wherein the determining whether the downlink data communication is scheduled over the single component carrier or the multiple component carriers includes:

determining whether at least one field of the DCI message indicates the downlink data communication is scheduled over the single component carrier or the multiple component carriers.

7. The method of clause 6, wherein the at least one field includes a first field associated with a first component carrier and a second field associated with a second component carrier.

8. The method of clause 7, wherein the determining whether the downlink data communication is scheduled over the single component carrier or the multiple component carriers includes:

determining the downlink data communication is scheduled over the single component carrier based on at least one of the first field or the second field having a value that is not assigned for a primary purpose of the respective field.

9. The method of clause 8, wherein the value is not assigned for a frequency domain resource allocation (FDRA).

10. The method of clause 8, wherein the determining whether the downlink data communication is scheduled over the single component carrier or the multiple component carriers includes:

determining the downlink data communication is scheduled over the multiple component carriers based on the first field and the second field having values that are assigned for the respective primary purpose of the first and second fields.

11. The method of any of clauses 1-10, wherein the DCI message includes a first hybrid automatic repeat request (HARQ) process ID associated with a first component carrier and a second HARQ process ID associated with a second component carrier.

12. The method of clause 11, wherein the downlink data communication scheduled by the DCI message includes a first retransmission associated with the first HARQ process ID and a second retransmission associated with the second HARQ process ID.

13. The method of any of clauses 1-10, wherein the DCI message includes a HARQ process ID associated with a first component carrier and a second component carrier.

14. The method of any of clauses 1-13, wherein:

the receiving the DCI message includes receiving the DCI message over a physical downlink control channel (PDCCH) of a secondary cell; and the receiving the downlink data communication includes receiving at least a first part of the downlink data communication over a physical downlink shared channel (PDSCH) of a primary cell.

15. The method of clause 14, wherein the receiving the downlink data communication further includes:

receiving at least a second part of the downlink data communication over a PDSCH of the secondary cell.

16. A method of wireless communication performed by a base station, the method comprising:

transmitting a first downlink control information (DCI) message having a DCI format, the first DCI message scheduling a first downlink data communication over a single component carrier;

transmitting the first downlink data communication over the single component carrier;

transmitting a second DCI message having the DCI format, the second DCI message scheduling a second downlink data communication over multiple component carriers; and transmitting the second downlink data communication over the multiple component carriers.

17. The method of clause 16, wherein:

the transmitting the first DCI message includes transmitting the first DCI message over a physical downlink control channel (PDCCH) of a secondary cell; and the transmitting the first downlink data communication includes transmitting the first downlink data communication over a physical downlink shared channel (PDSCH) of a primary cell.

18. The method of any of clauses 16-17, wherein:

the transmitting the second DCI message includes transmitting the second DCI message over a physical downlink control channel (PDCCH) of a secondary cell; and the transmitting the second downlink data communication on the multiple component carriers includes:

transmitting at least a first part of the second downlink data communication over a physical downlink shared channel (PDSCH) of a primary cell; and transmitting at least a second part of the second downlink data communication over a PDSCH of the secondary cell.

19. The method of any of clauses 16-18, wherein the transmitting the first DCI message includes transmitting the first DCI message in a first search space associated with the single component carrier.

20. The method of any of clauses 16-19, wherein the transmitting the second DCI message includes transmitting the second DCI message in a second search space associated with the multiple component carriers.

21. The method of any of clauses 16-20, wherein the transmitting the first DCI message includes transmitting the first DCI message with at least one field indicating the first downlink data communication is scheduled over the single component carrier.

22. The method of clause 21, wherein the at least one field includes a first field associated with a first component carrier and a second field associated with a second component carrier, and wherein the first field or the second field has a value that is not assigned for a primary purpose of the respective field.

23. The method of clause 22, wherein the value is not assigned for a frequency domain resource allocation (FDRA).

24. The method of any of clauses 16-23, wherein the transmitting the second DCI message includes transmitting the second DCI message with at least one field indicating the second downlink data communication is scheduled over the multiple component carriers.

25. The method of clause 24, wherein the at least one field includes a first field associated with a first component carrier and a second field associated with a second component carrier, and wherein a first value of the first field is an assigned value for a primary purpose of the first field and a second value of the second field is an assigned value for a primary purpose of the second field.

26. The method of any of clauses 16-25, wherein the second DCI message includes a first hybrid automatic repeat request (HARQ) process ID associated with a first component carrier and a second HARQ process ID associated with a second component carrier.

27. The method of clause 26, wherein the second downlink data communication scheduled by the second DCI message includes a first retransmission associated with the first HARQ process ID and a second retransmission associated with the second HARQ process ID.

28. The method of any of clauses 16-25, wherein the second DCI message includes a HARQ process ID associated with a first component carrier and a second component carrier.

29. The method of any of clauses 16-28, wherein:
the transmitting the first DCI message includes transmitting the first DCI message over a physical downlink control channel (PDCCH) of a non-dynamic spectrum sharing (non-DSS) cell; and
the transmitting the first downlink data communication includes transmitting the first downlink data communication over a physical downlink shared channel (PDSCH) of a DSS cell.

30. The method of any of clauses 16-29, wherein:
the transmitting the second DCI message includes transmitting the second DCI message over a physical downlink control channel (PDCCH) of a non-dynamic spectrum sharing (non-DSS) cell; and
the transmitting the second downlink data communication includes:
transmitting at least a first part of the second downlink data communication over a physical downlink shared channel (PDSCH) of a DSS cell; and
transmitting at least a second part of the second downlink data communication over a PDSCH of the a the non-DSS cell.

31. A user equipment, comprising:
a transceiver configured to receive a downlink control information (DCI) message having a DCI format, the DCI message scheduling a downlink data communication over a single component carrier or multiple component carriers; and
a processor in communication with the transceiver, the processor configured to determine, based on the received DCI message, whether the downlink data communication is scheduled over the single component carrier or the multiple component carriers,
wherein the transceiver is further configured to receive, based on the determination of the processor, the downlink data communication over the single component carrier or the multiple component carriers.

32. The user equipment of clause 31, wherein the processor is further configured to:
determine whether the DCI message has a first format associated with the single component carrier or a second format associated with the multiple component carriers.

33. The user equipment of any of clauses 31-32, wherein the processor is further configured to:
determine whether the received DCI message was received in a first search space associated with the single component carrier or a second search space associated with the multiple component carriers.

34. The user equipment of clause 33, wherein the transceiver is further configured to receive the DCI message in the first search space associated with the single component carrier.

35. The user equipment of clause 33, wherein the transceiver is further configured to receive the DCI message in the second search space associated with the multiple component carriers.

36. The user equipment of any of clauses 31-35, wherein the processor is further configured to:
determine whether at least one field of the DCI message indicates the downlink data communication is scheduled over the single component carrier or the multiple component carriers.

37. The user equipment of clause 36, wherein the at least one field includes a first field associated with a first component carrier and a second field associated with a second component carrier.

38. The user equipment of clause 37, wherein the processor is further configured to:
determine the downlink data communication is scheduled over the single component carrier based on at least one of the first field or the second field having a value that is not assigned for a primary purpose of the respective field.

39. The user equipment of clause 38, wherein the value is not assigned for a frequency domain resource allocation (FDRA).

40. The user equipment of clause 38, wherein the processor is further configured to:
determine the downlink data communication is scheduled over the multiple component carriers based on the first field and the second field having values that are assigned for the respective primary purpose of the first and second fields.

41. The user equipment of any of clauses 31-40, wherein the transceiver is further configured to receive the DCI message including a first hybrid automatic repeat request (HARQ) process ID associated with a first component carrier and a second HARQ process ID associated with a second component carrier.

42. The user equipment of clause 41, wherein the processor is further configured to:
determine the downlink data communication scheduled by the DCI message includes a first retransmission associated with the first HARQ process ID and a second retransmission associated with the second HARQ process ID.

43. The user equipment of any of clauses 31-40, wherein the transceiver is further configured to receive the DCI message including a HARQ process ID associated with a first component carrier and a second component carrier.

44. The user equipment of any of clauses 31-43, wherein the transceiver is further configured to:
receive the DCI message over a physical downlink control channel (PDCCH) of a secondary cell; and
receive at least a first part of the downlink data communication over a physical downlink shared channel (PDSCH) of a primary cell.

45. The user equipment of clause 44, wherein the transceiver is further configured to:
receive at least a second part of the downlink data communication over a PDSCH of the secondary cell.

46. A base station, comprising:
a transceiver configured to:
transmit a first downlink control information (DCI) message having a DCI format, the first DCI message scheduling a first downlink data communication over a single component carrier;
transmit the first downlink data communication over the single component carrier;
transmit a second DCI message having the DCI format, the second DCI message scheduling a second downlink data communication over multiple component carriers; and
transmit the second downlink data communication over the multiple component carriers.

47. The base station of clause 46, wherein transceiver is further configured to:
transmit the first DCI message over a physical downlink control channel (PDCCH) of a secondary cell; and
transmit the first downlink data communication over a physical downlink shared channel (PDSCH) of a primary cell.

48. The base station of any of clauses 46-47, wherein transceiver is further configured to:
transmit the second DCI message over a physical downlink control channel (PDCCH) of a secondary cell;
transmit at least a first part of the second downlink data communication over a physical downlink shared channel (PDSCH) of a primary cell; and
transmit at least a second part of the second downlink data communication over a PDSCH of the secondary cell.

49. The base station of any of clauses 46-48, wherein transceiver is further configured to:
transmit the first DCI message in a first search space associated with the single component carrier.

50. The base station of any of clauses 46-49, wherein transceiver is further configured to:
transmit the second DCI message in a second search space associated with the multiple component carriers.

51. The base station of any of clauses 46-50, wherein transceiver is further configured to:
transmit the first DCI message with at least one field indicating the first downlink data communication is scheduled over the single component carrier.

52. The base station of clause 51, wherein the at least one field includes a first field associated with a first component carrier and a second field associated with a second component carrier, and wherein the first field or the second field has a value that is not assigned for a primary purpose of the respective field.

53. The base station of clause 52, wherein the value is not assigned for a frequency domain resource allocation (FDRA).

54. The base station of any of clauses 46-53, wherein transceiver is further configured to:
transmit the second DCI message with at least one field indicating the second downlink data communication is scheduled over the multiple component carriers.

55. The base station of clause 54, wherein the at least one field includes a first field associated with a first component carrier and a second field associated with a second component carrier, and wherein a first value of the first field is an assigned value for a primary purpose of the first field and a second value of the second field is an assigned value for a primary purpose of the second field.

56. The base station of any of clauses 46-55, wherein transceiver is further configured to:
transmit the second DCI message including a first hybrid automatic repeat request (HARQ) process ID associated with a first component carrier and a second HARQ process ID associated with a second component carrier.

57. The base station of clause 56, wherein the second downlink data communication scheduled by the second DCI message includes a first retransmission associated with the first HARQ process ID and a second retransmission associated with the second HARQ process ID.

58. The base station of any of clauses 46-55, wherein transceiver is further configured to:
transmit the second DCI message including a HARQ process ID associated with a first component carrier and a second component carrier.

59. The base station of any of clauses 46-58, wherein transceiver is further configured to:
transmit the first DCI message over a physical downlink control channel (PDCCH) of a non-dynamic spectrum sharing (non-DSS) cell; and
transmit the first downlink data communication over a physical downlink shared channel (PDSCH) of a DSS cell.

60. The base station of any of clauses 46-59, wherein transceiver is further configured to:
transmit the second DCI message over a physical downlink control channel (PDCCH) of a non-dynamic spectrum sharing (non-DSS) cell;
transmit at least a first part of the second downlink data communication over a physical downlink shared channel (PDSCH) of a DSS cell; and
transmit at least a second part of the second downlink data communication over a PDSCH of the non-DSS cell.

61. A user equipment, comprising:
means for receiving a downlink control information (DCI) message having a DCI format, the DCI message scheduling a downlink data communication over a single component carrier or multiple component carriers;
means for determining, based on the received DCI message, whether the downlink data communication is scheduled over the single component carrier or the multiple component carriers; and means for receiving, based on the determining, the downlink data communication over the single component carrier or the multiple component carriers.

62. The user equipment of clause 61, wherein the means for determining whether the downlink data communication is scheduled over the single component carrier or the multiple component carriers includes:

means for determining whether the DCI message has a first format associated with the single component carrier or a second format associated with the multiple component carriers.

63. The user equipment of any of clauses 61-62, wherein the means for determining whether the downlink data communication is scheduled on the single component carrier or the multiple component carriers includes:

means for determining whether the received DCI message was received in a first search space associated with the single component carrier or a second search space associated with the multiple component carriers.

64. The user equipment of clause 63, wherein the means for receiving the DCI message includes means for receiving the DCI message in the first search space associated with the single component carrier.

65. The user equipment of clause 63, wherein the means for receiving the DCI message includes means for receiving the DCI message in the second search space associated with the multiple component carriers.

66. The user equipment of any of clauses 61-65, wherein the means for determining whether the downlink data communication is scheduled over the single component carrier or the multiple component carriers includes:

means for determining whether at least one field of the DCI message indicates the downlink data communication is scheduled over the single component carrier or the multiple component carriers.

67. The user equipment of clause 66, wherein the at least one field includes a first field associated with a first component carrier and a second field associated with a second component carrier.

68. The user equipment of clause 67, wherein the means for determining whether the downlink data communication is scheduled over the single component carrier or the multiple component carriers includes:

means for determining the downlink data communication is scheduled over the single component carrier based on at least one of the first field or the second field having a value that is not assigned for a primary purpose of the respective field.

69. The user equipment of clause 68, wherein the value is not assigned for a frequency domain resource allocation (FDRA).

70. The user equipment of clause 68, wherein the means for determining whether the downlink data communication is scheduled over the single component carrier or the multiple component carriers includes:

means for determining the downlink data communication is scheduled over the multiple component carriers based on the first field and the second field having values that are assigned for the respective primary purpose of the first and second fields.

71. The user equipment of any of clauses 61-70, wherein the DCI message includes a first hybrid automatic repeat request (HARQ) process ID associated with a first component carrier and a second HARQ process ID associated with a second component carrier.

72. The user equipment of clause 71, wherein the downlink data communication scheduled by the DCI message includes a first retransmission associated with the first HARQ process ID and a second retransmission associated with the second HARQ process ID.

73. The user equipment of any of clauses 61-70, wherein the DCI message includes a HARQ process ID associated with a first component carrier and a second component carrier.

74. The user equipment of any of clauses 61-73, wherein:

the means for receiving the DCI message includes means for receiving the DCI message over a physical downlink control channel (PDCCH) of a secondary cell; and the means for receiving the downlink data communication includes means for receiving at least a first part of the downlink data communication over a physical downlink shared channel (PDSCH) of a primary cell.

75. The user equipment of clause 74, wherein the means for receiving the downlink data communication further includes:

means for receiving at least a second part of the downlink data communication over a PDSCH of the secondary cell.

76. A base station, comprising:

means for transmitting a first downlink control information (DCI) message having a DCI format, the first DCI message scheduling a first downlink data communication over a single component carrier;

means for transmitting the first downlink data communication over the single component carrier;

means for transmitting a second DCI message having the DCI format, the second DCI message scheduling a second downlink data communication over multiple component carriers; and means for transmitting the second downlink data communication over the multiple component carriers.

77. The base station of clause 76, wherein:

the means for transmitting the first DCI message includes means for transmitting the first DCI message over a physical downlink control channel (PDCCH) of a secondary cell; and the means for transmitting the first downlink data communication includes means for transmitting the first downlink data communication over a physical downlink shared channel (PDSCH) of a primary cell.

78. The base station of any of clauses 76-77, wherein:

the means for transmitting the second DCI message includes means for transmitting the second DCI message over a physical downlink control channel (PDCCH) of a secondary cell; and the means for transmitting the second downlink data communication on the multiple component carriers includes:

means for transmitting at least a first part of the second downlink data communication over a physical downlink shared channel (PDSCH) of a primary cell; and means for transmitting at least a second part of the second downlink data communication over a PDSCH of the secondary cell.

79. The base station of any of clauses 76-78, wherein the means for transmitting the first DCI message includes means for transmitting the first DCI message in a first search space associated with the single component carrier.

80. The base station of any of clauses 76-79, wherein the means for transmitting the second DCI message includes means for transmitting the second DCI message in a second search space associated with the multiple component carriers.

81. The base station of any of clauses 76-80, wherein the means for transmitting the first DCI message includes means for transmitting the first DCI message with at least one field indicating the first downlink data communication is scheduled over the single component carrier.

82. The base station of clause 81, wherein the at least one field includes a first field associated with a first component carrier and a second field associated with a second component carrier, and wherein the first field or the second field has a value that is not assigned for a primary purpose of the respective field.

83. The base station of clause 82, wherein the value is not assigned for a frequency domain resource allocation (FDRA).

84. The base station of any of clauses 76-83, wherein the means for transmitting the second DCI message includes means for transmitting the second DCI message with at least one field indicating the second downlink data communication is scheduled over the multiple component carriers.

85. The base station of clause 84, wherein the at least one field includes a first field associated with a first component carrier and a second field associated with a second component carrier, and wherein a first value of the first field is an assigned value for a primary purpose of the first field and a second value of the second field is an assigned value for a primary purpose of the second field.

86. The base station of any of clauses 76-85, wherein the second DCI message includes a first hybrid automatic repeat request (HARQ) process ID associated with a first component carrier and a second HARQ process ID associated with a second component carrier.

87. The base station of clause 86, wherein the second downlink data communication scheduled by the second DCI message includes a first retransmission associated with the first HARQ process ID and a second retransmission associated with the second HARQ process ID.

88. The base station of any of clauses 76-85, wherein the second DCI message includes a HARQ process ID associated with a first component carrier and a second component carrier.

89. The base station of any of clauses 76-88, wherein:
the means for transmitting the first DCI message includes means for transmitting the first DCI message over a physical downlink control channel (PDCCH) of a non-dynamic spectrum sharing (non-DSS) cell; and
the means for transmitting the first downlink data communication includes means for transmitting the first downlink data communication over a physical downlink shared channel (PDSCH) of a DSS cell.

90. The base station of any of clauses 76-89, wherein:
the means for transmitting the second DCI message includes means for transmitting the second DCI message over a physical downlink control channel (PDCCH) of a non-dynamic spectrum sharing (non-DSS) cell; and
the means for transmitting the second downlink data communication includes:
means for transmitting at least a first part of the second downlink data communication over a physical downlink shared channel (PDSCH) of a DSS cell; and
means for transmitting at least a second part of the second downlink data communication over a PDSCH of the non-DSS cell.

91. A non-transitory computer-readable medium having program code recorded thereon for wireless communication by a user equipment, the program code comprising:

code for causing the user equipment to receive a downlink control information (DCI) message having a DCI format, the DCI message scheduling a downlink data communication over a single component carrier or multiple component carriers;
code for causing the user equipment to determine, based on the received DCI message, whether the downlink data communication is scheduled over the single component carrier or the multiple component carriers; and
code for causing the user equipment to receive, based on the determining, the downlink data communication over the single component carrier or the multiple component carriers.

92. The non-transitory computer-readable medium of clause 91, wherein the code for causing the user equipment to determine whether the downlink data communication is scheduled over the single component carrier or the multiple component carriers includes:
code for causing the user equipment to determine whether the DCI message has a first format associated with the single component carrier or a second format associated with the multiple component carriers.

93. The non-transitory computer-readable medium of any of clauses 91-92, wherein the code for causing the user equipment to determine whether the downlink data communication is scheduled on the single component carrier or the multiple component carriers includes:
code for causing the user equipment to determine whether the received DCI message was received in a first search space associated with the single component carrier or a second search space associated with the multiple component carriers.

94. The non-transitory computer-readable medium of clause 93, wherein the code for causing the user equipment to receive the DCI message includes code for causing the user equipment to receive the DCI message in the first search space associated with the single component carrier.

95. The non-transitory computer-readable medium of clause 93, wherein the code for causing the user equipment to receive the DCI message includes code for causing the user equipment to receive the DCI message in the second search space associated with the multiple component carriers.

96. The non-transitory computer-readable medium of any of clauses 91-95, wherein the code for causing the user equipment to determine whether the downlink data communication is scheduled over the single component carrier or the multiple component carriers includes:
code for causing the user equipment to determine whether at least one field of the DCI message indicates the downlink data communication is scheduled over the single component carrier or the multiple component carriers.

97. The non-transitory computer-readable medium of clause 96, wherein the at least one field includes a first field associated with a first component carrier and a second field associated with a second component carrier.

98. The non-transitory computer-readable medium of clause 97, wherein the code for causing the user equipment to determine whether the downlink data communication is scheduled over the single component carrier or the multiple component carriers includes:
code for causing the user equipment to determine the downlink data communication is scheduled over the single component carrier based on at least one of the first field or the second field having a value that is not assigned for a primary purpose of the respective field.

99. The non-transitory computer-readable medium of clause 98, wherein the value is not assigned for a frequency domain resource allocation (FDRA).
100. The non-transitory computer-readable medium of clause 98, wherein the code for causing the user equipment to determine whether the downlink data communication is scheduled over the single component carrier or the multiple component carriers includes:
code for causing the user equipment to determine the downlink data communication is scheduled over the multiple component carriers based on the first field and the second field having values that are assigned for the respective primary purpose of the first and second fields.
101. The non-transitory computer-readable medium of any of clauses 91-100, wherein the code for causing the user equipment to receive the DCI message includes code for causing the user equipment to receive the DCI message including a first hybrid automatic repeat request (HARQ) process ID associated with a first component carrier and a second HARQ process ID associated with a second component carrier.
102. The non-transitory computer-readable medium of clause 101, wherein the downlink data communication scheduled by the DCI message includes a first retransmission associated with the first HARQ process ID and a second retransmission associated with the second HARQ process ID.
103. The non-transitory computer-readable medium of any of clauses 91-100, wherein the code for causing the user equipment to receive the DCI message includes code for causing the user equipment to receive the DCI message including a HARQ process ID associated with a first component carrier and a second component carrier.
104. The non-transitory computer-readable medium of any of clauses 91-103, wherein:
the code for causing the user equipment to receive the DCI message includes code for causing the user equipment to receive the DCI message over a physical downlink control channel (PDCCH) of a secondary cell; and
the code for causing the user equipment to receive the downlink data communication includes code for causing the user equipment to receive at least a first part of the downlink data communication over a physical downlink shared channel (PDSCH) of a primary cell.
105. The non-transitory computer-readable medium of clause 104, wherein the code for causing the user equipment to receive the downlink data communication further includes:
code for causing the user equipment to receive at least a second part of the downlink data communication over a PDSCH of the secondary cell.
106. A non-transitory computer-readable medium having program code recorded thereon for wireless communication by a base station, the program code comprising:
code for causing the base station to transmit a first downlink control information (DCI) message having a DCI format, the first DCI message scheduling a first downlink data communication over a single component carrier;
code for causing the base station to transmit the first downlink data communication over the single component carrier;
code for causing the base station to transmit a second DCI message having the DCI format, the second DCI message scheduling a second downlink data communication over multiple component carriers; and
code for causing the base station to transmit the second downlink data communication over the multiple component carriers.
107. The non-transitory computer-readable medium of clause 106, wherein:
the code for causing the base station to transmit the first DCI message includes code for causing the base station to transmit the first DCI message over a physical downlink control channel (PDCCH) of a secondary cell; and
the code for causing the base station to transmit the first downlink data communication includes code for causing the base station to transmit the first downlink data communication over a physical downlink shared channel (PDSCH) of a primary cell.
108. The non-transitory computer-readable medium of any of clauses 106-107, wherein:
the code for causing the base station to transmit the second DCI message includes code for causing the base station to transmit the second DCI message over a physical downlink control channel (PDCCH) of a secondary cell; and
the code for causing the base station to transmit the second downlink data communication on the multiple component carriers includes:
code for causing the base station to transmit at least a first part of the second downlink data communication over a physical downlink shared channel (PDSCH) of a primary cell; and
code for causing the base station to transmit at least a second part of the second downlink data communication over a PDSCH of the secondary cell.
109. The non-transitory computer-readable medium of any of clauses 106-108, wherein the code for causing the base station to transmit the first DCI message includes code for causing the base station to transmit the first DCI message in a first search space associated with the single component carrier.
110. The non-transitory computer-readable medium of any of clauses 106-109, wherein the code for causing the base station to transmit the second DCI message includes code for causing the base station to transmit the second DCI message in a second search space associated with the multiple component carriers.
111. The non-transitory computer-readable medium of any of clauses 106-110, wherein the code for causing the base station to transmit the first DCI message includes code for causing the base station to transmit the first DCI message with at least one field indicating the first downlink data communication is scheduled over the single component carrier.
112. The non-transitory computer-readable medium of clause 111, wherein the at least one field includes a first field associated with a first component carrier and a second field associated with a second component carrier, and wherein the first field or the second field has a value that is not assigned for a primary purpose of the respective field.
113. The non-transitory computer-readable medium of clause 112, wherein the value is not assigned for a frequency domain resource allocation (FDRA).
114. The non-transitory computer-readable medium of any of clauses 106-113, wherein the code for causing the base station to transmit the second DCI message includes code for causing the base station to transmit the second DCI message with at least one field indicating the second downlink data communication is scheduled over the multiple component carriers.

115. The non-transitory computer-readable medium of clause 114, wherein the at least one field includes a first field associated with a first component carrier and a second field associated with a second component carrier, and wherein a first value of the first field is an assigned value for a primary purpose of the first field and a second value of the second field is an assigned value for a primary purpose of the second field.

116. The non-transitory computer-readable medium of any of clauses 106-115, wherein the code for causing the base station to transmit the second DCI message includes code for causing the base station to transmit the second DCI message including a first hybrid automatic repeat request (HARQ) process ID associated with a first component carrier and a second HARQ process ID associated with a second component carrier.

117. The non-transitory computer-readable medium of clause 116, wherein the second downlink data communication scheduled by the second DCI message includes a first retransmission associated with the first HARQ process ID and a second retransmission associated with the second HARQ process ID.

118. The non-transitory computer-readable medium of any of clauses 106-115, wherein the code for causing the base station to transmit the second DCI message includes code for causing the base station to transmit the second DCI message including a HARQ process ID associated with a first component carrier and a second component carrier.

119. The non-transitory computer-readable medium of any of clauses 106-118, wherein:
the code for causing the base station to transmit the first DCI message includes code for causing the base station to transmit the first DCI message over a physical downlink control channel (PDCCH) of a non-dynamic spectrum sharing (non-DSS) cell; and
the code for causing the base station to transmit the first downlink data communication includes code for causing the base station to transmit the first downlink data communication over a physical downlink shared channel (PDSCH) of a DSS cell.

120. The non-transitory computer-readable medium of any of clauses 106-119, wherein:
the code for causing the base station to transmit the second DCI message includes code for causing the base station to transmit the second DCI message over a physical downlink control channel (PDCCH) of a non-dynamic spectrum sharing (non-DSS) cell; and
the code for causing the base station to transmit the second downlink data communication includes:
code for causing the base station to transmit at least a first part of the second downlink data communication over a physical downlink shared channel (PDSCH) of a DSS cell; and
code for causing the base station to transmit at least a second part of the second downlink data communication over a PDSCH of the non-DSS cell.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely some examples thereof, but rather, should be fully commensurate with that of the claims appended hereafter and their functional equivalents.

What is claimed is:

1. A method of wireless communication performed by a user equipment, the method comprising:
receiving a downlink control information (DCI) message having a DCI format, the DCI message scheduling a downlink data communication over a single component carrier or multiple component carriers, wherein the DCI message includes a first hybrid automatic repeat request (HARQ) process ID associated with a first component carrier and a second HARQ process ID associated with a second component carrier, the second HARQ process ID different from the first HARQ process ID;
determining, based on the received DCI message, whether the downlink data communication is scheduled over the single component carrier or the multiple component carriers;
receiving, based on the determining, the downlink data communication over the single component carrier or the multiple component carriers; and
transmitting, based on at least one of the first HARQ process ID or the second HARQ process ID, a HARQ feedback for the downlink data communication received over the single component carrier or the multiple component carriers.

2. The method of claim 1, wherein the determining whether the downlink data communication is scheduled over the single component carrier or the multiple component carriers includes:
   determining whether the DCI message has a first format associated with the single component carrier or a second format associated with the multiple component carriers.

3. The method of claim 1, wherein the determining whether the downlink data communication is scheduled on the single component carrier or the multiple component carriers includes:
   determining whether the received DCI message was received in a first search space associated with the single component carrier or a second search space associated with the multiple component carriers.

4. The method of claim 3, wherein the receiving the DCI message includes receiving the DCI message in the first search space associated with the single component carrier.

5. The method of claim 3, wherein the receiving the DCI message includes receiving the DCI message in the second search space associated with the multiple component carriers.

6. The method of claim 1, wherein the determining whether the downlink data communication is scheduled over the single component carrier or the multiple component carriers includes:
   determining whether at least one field of the DCI message indicates the downlink data communication is scheduled over the single component carrier or the multiple component carriers.

7. The method of claim 6, wherein the at least one field includes a first field associated with the first component carrier and a second field associated with the second component carrier.

8. The method of claim 7, wherein the determining whether the downlink data communication is scheduled over the single component carrier or the multiple component carriers includes:
   determining the downlink data communication is scheduled over the single component carrier based on at least one of the first field or the second field having a value that is not assigned for a primary purpose of the respective field.

9. The method of claim 8, wherein the value is not assigned for a frequency domain resource allocation (FDRA).

10. The method of claim 8, wherein the determining whether the downlink data communication is scheduled over the single component carrier or the multiple component carriers includes:
    determining the downlink data communication is scheduled over the multiple component carriers based on the first field and the second field having values that are assigned for the respective primary purpose of the first and second fields.

11. The method of claim 1, wherein the downlink data communication scheduled by the DCI message includes a first retransmission associated with the first HARQ process ID and a second retransmission associated with the second HARQ process ID.

12. The method of claim 1, wherein the DCI message includes a third HARQ process ID associated with the first component carrier and the second component carrier.

13. The method of claim 1, wherein:
    the receiving the DCI message includes receiving the DCI message over a physical downlink control channel (PDCCH) of a secondary cell; and
    the receiving the downlink data communication includes receiving at least a first part of the downlink data communication over a physical downlink shared channel (PDSCH) of a primary cell.

14. The method of claim 13, wherein the receiving the downlink data communication further includes:
    receiving at least a second part of the downlink data communication over a PDSCH of the secondary cell.

15. A user equipment, comprising:
    a transceiver configured to receive a downlink control information (DCI) message having a DCI format, the DCI message scheduling a downlink data communication over a single component carrier or multiple component carriers, wherein the DCI message includes a first hybrid automatic repeat request (HARQ) process ID associated with a first component carrier and a second HARQ process ID associated with a second component carrier, the second HARQ process ID different from the first HARQ process ID;
    a processor in communication with the transceiver, the processor configured to determine, based on the received DCI message, whether the downlink data communication is scheduled over the single component carrier or the multiple component carriers,
    wherein the transceiver is further configured to:
    receive, based on the determination of the processor, the downlink data communication over the single component carrier or the multiple component carriers; and
    transmit, based on at least one of the first HARQ process ID or the second HARQ process ID, a HARQ feedback for the downlink data communication received over the single component carrier or the multiple component carriers.

16. The user equipment of claim 15, wherein the processor is further configured to:
    determine whether the DCI message has a first format associated with the single component carrier or a second format associated with the multiple component carriers.

17. The user equipment of claim 15, wherein the processor is further configured to:
    determine whether the received DCI message was received in a first search space associated with the single component carrier or a second search space associated with the multiple component carriers.

18. The user equipment of claim 15, wherein the processor is further configured to:
    determine whether at least one field of the DCI message indicates the downlink data communication is scheduled over the single component carrier or the multiple component carriers.

19. The user equipment of claim 18, wherein the at least one field includes a first field associated with the first component carrier and a second field associated with the second component carrier.

20. The user equipment of claim 19, wherein the processor is further configured to:
    determine the downlink data communication is scheduled over the single component carrier based on at least one of the first field or the second field having a value that is not assigned for a primary purpose of the respective field.

21. The user equipment of claim 20, wherein the value is not assigned for a frequency domain resource allocation (FDRA).

22. The user equipment of claim 20, wherein the processor is further configured to:
   determine the downlink data communication is scheduled over the multiple component carriers based on the first field and the second field having values that are assigned for the respective primary purpose of the first and second fields.

23. The user equipment of claim 15, wherein the processor is further configured to:
   determine the downlink data communication scheduled by the DCI message includes a first retransmission associated with the first HARQ process ID and a second retransmission associated with the second HARQ process ID.

24. The user equipment of claim 15, wherein the transceiver is further configured to receive the DCI message including a third HARQ process ID associated with the first component carrier and the second component carrier.

25. The user equipment of claim 15, wherein the transceiver is further configured to:
   receive the DCI message over a physical downlink control channel (PDCCH) of a secondary cell; and
   receive at least a first part of the downlink data communication over a physical downlink shared channel (PDSCH) of a primary cell.

26. The user equipment of claim 25, wherein the transceiver is further configured to:
   receive at least a second part of the downlink data communication over a PDSCH of the secondary cell.

27. A user equipment, comprising:
   means for receiving a downlink control information (DCI) message having a DCI format, the DCI message scheduling a downlink data communication over a single component carrier or multiple component carriers, wherein the DCI message includes a first hybrid automatic repeat request (HARQ) process ID associated with a first component carrier and a second HARQ process ID associated with a second component carrier, the second HARQ process ID different from the first HARQ process ID;
   means for determining, based on the received DCI message, whether the downlink data communication is scheduled over the single component carrier or the multiple component carriers;
   means for receiving, based on the determining, the downlink data communication over the single component carrier or the multiple component carriers; and
   means for transmitting, based on at least one of the first HARQ process ID or the second HARQ process ID, a HARQ feedback for the downlink data communication received over the single component carrier or the multiple component carriers.

28. A non-transitory computer-readable medium having program code recorded thereon for wireless communication by a user equipment, the program code comprising:
   code for causing the user equipment to receive a downlink control information (DCI) message having a DCI format, the DCI message scheduling a downlink data communication over a single component carrier or multiple component carriers, wherein the DCI message includes a first hybrid automatic repeat request (HARQ) process ID associated with a first component carrier and a second HARQ process ID associated with a second component carrier, the second HARQ process ID different from the first HARQ process ID;
   code for causing the user equipment to determine, based on the received DCI message, whether the downlink data communication is scheduled over the single component carrier or the multiple component carriers;
   code for causing the user equipment to receive, based on the determining, the downlink data communication over the single component carrier or the multiple component carriers; and
   code for causing the user equipment to transmit, based on at least one of the first HARQ process ID or the second HARQ process ID, a HARQ feedback for the downlink data communication received over the single component carrier or the multiple component carriers.

* * * * *